US012238795B2

(12) United States Patent
Lee et al.

(10) Patent No.: US 12,238,795 B2
(45) Date of Patent: Feb. 25, 2025

(54) ELECTRONIC DEVICE FOR PERFORMING CONNECTION TO NODE BASED ON STATUS OF NETWORK AND METHOD FOR THE SAME

(71) Applicant: SAMSUNG ELECTRONICS CO., LTD., Suwon-si (KR)

(72) Inventors: Kyoungho Lee, Suwon-si (KR); Kipyo Nam, Suwon-si (KR); Sungsick Kim, Suwon-si (KR); Janggun Bae, Suwon-si (KR); Keonyoung Lee, Suwon-si (KR); Jinmo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 681 days.

(21) Appl. No.: 17/586,468

(22) Filed: Jan. 27, 2022

(65) Prior Publication Data

US 2022/0353934 A1    Nov. 3, 2022

Related U.S. Application Data

(63) Continuation of application No. PCT/KR2021/020266, filed on Dec. 30, 2021.

(30) Foreign Application Priority Data

Apr. 29, 2021 (KR) .................. 10-2021-0056020
Jun. 9, 2021 (KR) .................. 10-2021-0075075

(51) Int. Cl.
*H04W 76/15* (2018.01)
*H04W 76/30* (2018.01)

(52) U.S. Cl.
CPC ........... *H04W 76/15* (2018.02); *H04W 76/30* (2018.02)

(58) Field of Classification Search
CPC ............................. H04W 76/15; H04W 76/30
See application file for complete search history.

(56) References Cited

U.S. PATENT DOCUMENTS 9,264,945 B2   2/2016   Ramachandran et al.
10,244,415 B2  3/2019   Zhang et al.
(Continued)

FOREIGN PATENT DOCUMENTS

KR   10-2007-0069930   7/2007
KR   10-1488960       2/2015
(Continued)

OTHER PUBLICATIONS

Search Report and Written Opinion issued May 3, 2022 in counterpart International Patent Application No. PCT/ KR2021/020266.
(Continued)

*Primary Examiner* — Natasha W Cosme
(74) *Attorney, Agent, or Firm* — Nixon & Vanderhye, P.C.

(57) ABSTRACT

In an electronic device and a method for operating an electronic device according to various embodiments of the disclosure, the electronic device may include: a first communication circuit configured to support first cellular communication; a second communication circuit configured to support second cellular communication; and a processor, and the processor may be configured to: control the second communication circuit such that the first cellular communication connection is released and the second cellular communication connection is performed or the second cellular communication connection is maintained in response to reception and/or transmission of a call connection request message while being connected to a network, determine, in response to termination of the call connection, whether to release the second cellular communication based on whether at least one condition including a condition related to (Continued)

whether a system information block receivable via the second cellular communication is received is satisfied, and perform the first cellular communication connection based on information for the first cellular communication connection included in the system information block.

20 Claims, 12 Drawing Sheets

(56) References Cited

U.S. PATENT DOCUMENTS

| | | |
|---|---|---|
| 10,531,350 B2 | 1/2020 | Moon et al. |
| 2011/0064052 A1 | 3/2011 | Lee |
| 2013/0148629 A1 | 6/2013 | Das et al. |
| 2014/0079021 A1 | 3/2014 | Hsu |
| 2017/0135151 A1* | 5/2017 | Fujishiro .............. H04W 72/04 |
| 2021/0227376 A1 | 7/2021 | Jha et al. |
| 2021/0258835 A1 | 8/2021 | Zhu et al. |
| 2021/0289430 A1 | 9/2021 | Hwang et al. |
| 2022/0191758 A1 | 6/2022 | Sridharan |

FOREIGN PATENT DOCUMENTS

| | | |
|---|---|---|
| KR | 10-2015-0086593 | 7/2015 |
| KR | 10-1593410 | 2/2016 |
| KR | 10-2016-0110994 | 9/2016 |
| KR | 10-1987071 | 6/2019 |
| KR | 10-2020-0007485 | 1/2020 |
| KR | 10-2020-0009772 | 1/2020 |
| KR | 10-2021-0039498 | 4/2021 |

OTHER PUBLICATIONS

Office Action issued Jul. 14, 2022 in counterpart Korean Patent Application No. 10-2021-0075075.

* cited by examiner

ELECTRONIC DEVICE FOR PERFORMING CONNECTION TO NODE BASED ON STATUS OF NETWORK AND METHOD FOR THE SAME

CROSS-REFERENCE TO RELATED APPLICATIONS

This application is a continuation of International Application No. PCT/KR2021/020266 designating the United States, filed on Dec. 30, 2021, in the Korean Intellectual Property Receiving Office and claiming priority to Korean Patent Application No. 10-2021-0056020, filed on Apr. 29, 2021, in the Korean Intellectual Property Office and Korean Patent Application No. 10-2021-0075075, filed on Jun. 9, 2021, in the Korean Intellectual Property Office, the disclosures of all of which are incorporated by reference herein in their entireties.

BACKGROUND

Field

The disclosure relates to an electronic device and a method for operating an electronic device and, for example, to an electronic device configured to perform connection to a node based on the status of a network.

Description of Related Art

There have been efforts to develop improved 5G communication systems or pre-5G communication systems to satisfy wireless data traffic demands that have been increasing since commercialization of 4G communication systems. For this reason, 5G communication systems or pre-5G communication systems are referred to as Beyond 4G network communication systems or Post LTE systems. In order to accomplish higher data transmission rates, it has been considered to implement 5G communication systems in super-higher frequency (mmWave) bands (for example, 6 GHz or higher bands) in addition to frequency bands that have been used by LTE (6 GHz or lower bands). There has been discussion on technologies, in 5G communication systems, regarding beamforming, massive MIMO, full dimensional MIMO (FD-MIMO), array antenna, analog beam-forming, and large scale antenna.

5G mobile communication systems may support a non-standalone (NSA) mode in which data is transmitted to or received from a 4G cellular communication base station and a 5G cellular communication base station, or a standalone (SA) mode in which data is transmitted to or received from a 5G cellular communication base station.

An electronic device may perform call connection to an external electronic device while being connected to 5G mobile communication through a node that supports the SA mode. Due to limitations of 5G mobile communication, the electronic device may establish and use call connection through 4G mobile communication, for stable connection. After ending call connection through 4G mobile communication, the electronic device may perform an operation of searching for a node that supports the SA mode, in order to be reconnect to 5G mobile communication. The electronic device may search for a node that supports the SA mode after releasing connection through 4G mobile communication, and it may take a long time to search for a node that supports the SA mode. Furthermore, if the electronic device fails to search for a node that supports the SA mode, or if connection through 5G mobile communication through the discovered node fails, transmission or reception of use data or control data may be limited.

SUMMARY

An electronic device according to various example embodiments of the disclosure may include: a first communication circuit configured to support first cellular communication; a second communication circuit configured to support second cellular communication; and a processor, wherein the processor is configured to: control the second communication circuit such that the first cellular communication connection is released and the second cellular communication connection is performed in response to reception and/or transmission of a call connection request message while being connected to a network via the first cellular communication; determine, in response to termination of the call connection, whether to release the second cellular communication based on whether at least one condition including a condition related to whether a system information block receivable via the second cellular communication is received is satisfied; and perform the first cellular communication connection based on information for the first cellular communication connection included in the system information block.

A method for operating an electronic device according to various example embodiments of the disclosure may include: releasing first cellular communication connection and performing second cellular communication connection in response to reception of a call connection request message in a state in which a network connection is established through the first cellular communication; determining, in response to termination of the call connection, whether to release the second cellular communication connection based on whether at least one condition including a condition related to whether a system information block received via the second cellular communication is received is satisfied; and performing the first cellular communication connection based on information for the first cellular communication connection included in the system information block.

An electronic device and a method for operating an electronic device according to various example embodiments of the disclosure may be configured such that, after connection of a call channel is released, and while connection of second cellular communication is maintained, connection of second cellular communication may be released and/or connection of first cellular communication may be performed, based on whether or not at least one condition including a condition related to whether or not designated system information is received, is satisfied. Therefore, after releasing the call connection, the electronic device may not instantly release connection of the second cellular communication, and may release connection of the second cellular connection only if the at least one condition is satisfied, thereby minimizing and/or reducing the interval in which no data can be received or transmitted after the call connection is released.

An electronic device and a method for operating an electronic device according to various example embodiments of the disclosure may be configured such that, after connection of a call channel is released, connection of first cellular communication may be performed based on information for connection of first cellular communication, included in system information. Therefore, the electronic device may search for a node that supports the first cellular communication using a frequency band included in information for connection of the first cellular communication, not all frequency bands that the electronic device can support, thereby reducing the time necessary to connect the first cellular communication.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
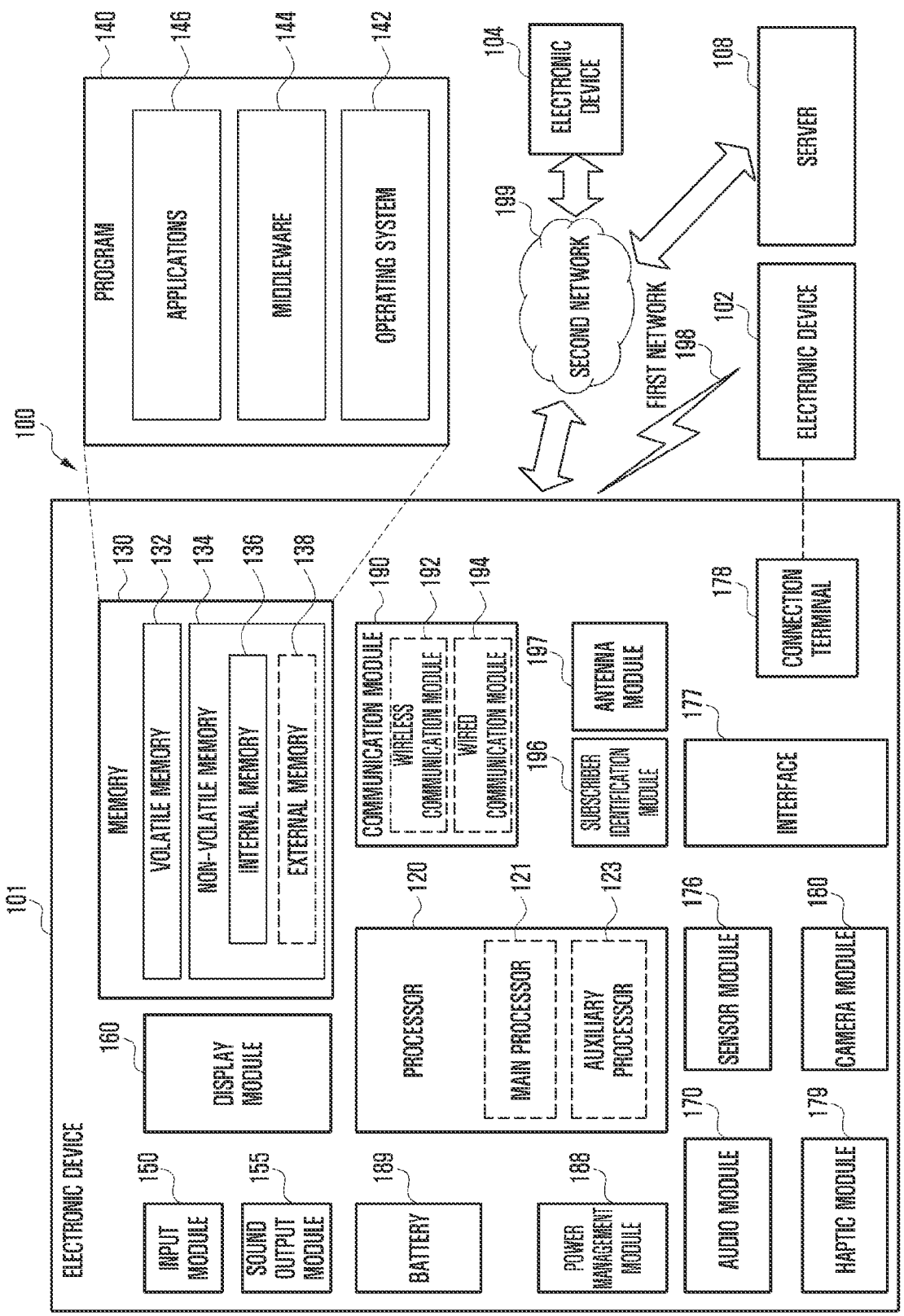
FIG. 1 is a block diagram illustrating an example electronic device in a network environment according to various embodiments.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160). 11

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Figure 2:
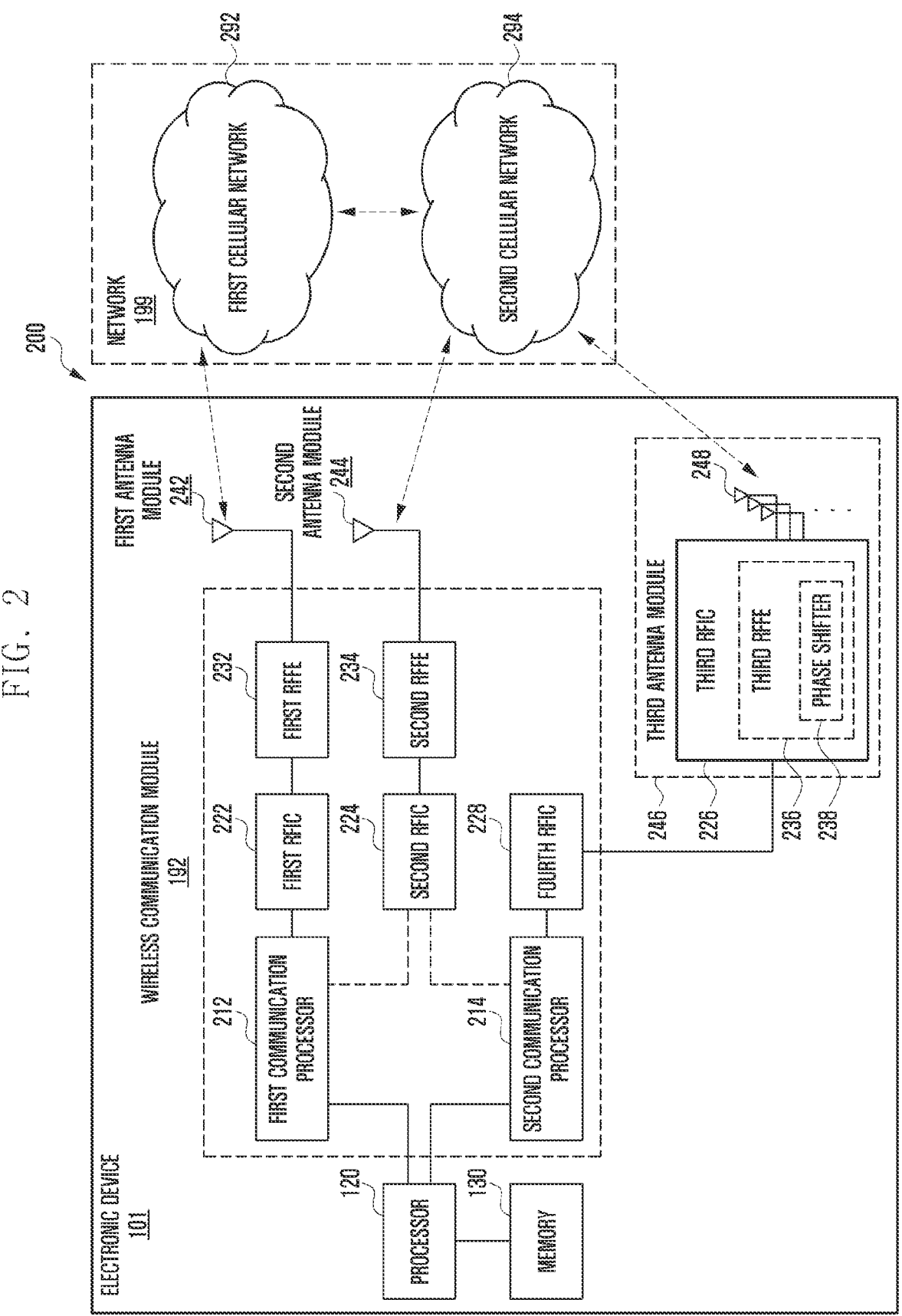
FIG. 2 is a block diagram illustrating an example configuration of an electronic device for supporting legacy network communication and 5G network communication, according to various embodiments.

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology. FIG. 2 is a block diagram illustrating an example configuration of an electronic device in a network environment including a plurality of cellular networks according to various embodiments.

Referring to FIG. 2, the electronic device 101 may include a first communication processor (e.g., including processing circuitry) 212, second communication processor (e.g., including processing circuitry) 214, first RFIC 222, second RFIC 224, third RFIC 226, fourth RFIC 228, first radio frequency front end (RFFE) 232, second RFFE 234, first antenna module 242, second antenna module 244, and antenna 248. The electronic device 101 may include a processor (e.g., including processing circuitry) 120 and a memory 130. A second network 199 may include a first cellular network 292 and a second cellular network 294. According to an embodiment, the electronic device 101 may further include at least one of the components described with reference to FIG. 1, and the second network 199 may further include at least one other network. According to an embodiment, the first communication processor 212, second communication processor 214, first RFIC 222, second RFIC 224, fourth RFIC 228, first RFFE 232, and second RFFE 234 may form at least part of the wireless communication module 192. According to an embodiment, the fourth RFIC 228 may be omitted or included as part of the third RFIC 226.

The first communication processor 212 may include various processing circuitry and establish a communication channel of a band to be used for wireless communication with the first cellular network 292 and support legacy network communication through the established communication channel. According to various embodiments, the first cellular network may be a legacy network including a second generation (2G), 3G, 4G, or long term evolution (LTE) network. The second communication processor 214 may include various processing circuitry and establish a communication channel corresponding to a designated band (e.g., about 6 GHz to about 60 GHz) of bands to be used for wireless communication with the second cellular network 294, and support fifth generation (5G) network communication through the established communication channel. According to various embodiments, the second cellular network 294 may be a 5G network defined in 3rd generation partnership project (3GPP). Additionally, according to an embodiment, the first communication processor 212 or the second communication processor 214 may establish a communication channel corresponding to another designated band (e.g., about 6 GHz or less) of bands to be used for wireless communication with the second cellular network 294 and support 5G network communication through the established communication channel. According to an embodiment, the first communication processor 212 and the second communication processor 214 may be implemented in a single chip or a single package. According to various embodiments, the first communication processor 212 or the second communication processor 214 may be formed in a single chip or a single package with the processor 120, the auxiliary processor 123, or the communication module 190.

Upon transmission, the first RFIC 222 may convert a baseband signal generated by the first communication processor 212 to a radio frequency (RF) signal of about 700 MHz to about 3 GHz used in the first cellular network 292 (e.g., legacy network). Upon reception, an RF signal may be obtained from the first cellular network 292 (e.g., legacy network) through an antenna (e.g., the first antenna module 242) and be preprocessed through an RFFE (e.g., the first RFFE 232). The first RFIC 222 may convert the preprocessed RF signal to a baseband signal so as to be processed by the first communication processor 212.

Upon transmission, the second RFIC 224 may convert a baseband signal generated by the first communication processor 212 or the second communication processor 214 to an RF signal (hereinafter, 5G Sub6 RF signal) of a Sub6 band (e.g., 6 GHz or less) to be used in the second cellular network 294 (e.g., 5G network). Upon reception, a 5G Sub6 RF signal may be obtained from the second cellular network 294 (e.g., 5G network) through an antenna (e.g., the second antenna module 244) and be pretreated through an RFFE (e.g., the second RFFE 234). The second RFIC 224 may convert the preprocessed 5G Sub6 RF signal to a baseband signal so as to be processed by a corresponding communication processor of the first communication processor 212 or the second communication processor 214.

The third RFIC 226 may convert a baseband signal generated by the second communication processor 214 to an RF signal (hereinafter, 5G Above6 RF signal) of a 5G Above6 band (e.g., about 6 GHz to about 60 GHz) to be used in the second cellular network 294 (e.g., 5G network). Upon reception, a 5G Above6 RF signal may be obtained from the second cellular network 294 (e.g., 5G network) through an antenna (e.g., the antenna 248) and be preprocessed through the third RFFE 236. The third RFIC 226 may convert the preprocessed 5G Above6 RF signal to a baseband signal so as to be processed by the second communication processor 214. According to an embodiment, the third RFFE 236 may be formed as part of the third RFIC 226.

According to an embodiment, the electronic device 101 may include a fourth RFIC 228 separately from the third RFIC 226 or as at least part of the third RFIC 226. In this case, the fourth RFIC 228 may convert a baseband signal generated by the second communication processor 214 to an RF signal (hereinafter, an intermediate frequency (IF) signal) of an intermediate frequency band (e.g., about 9 GHz to about 11 GHz) and transfer the IF signal to the third RFIC 226. The third RFIC 226 may convert the IF signal to a 5G Above 6RF signal. Upon reception, the 5G Above 6RF signal may be received from the second cellular network 294 (e.g., a 5G network) through an antenna (e.g., the antenna 248) and be converted to an IF signal by the third RFIC 226.

The fourth RFIC 228 may convert an IF signal to a baseband signal so as to be processed by the second communication processor 214.

According to an embodiment, the first RFIC 222 and the second RFIC 224 may be implemented into at least part of a single package or a single chip. According to an embodiment, the first RFFE 232 and the second RFFE 234 may be implemented into at least part of a single package or a single chip. According to an embodiment, at least one of the first antenna module 242 or the second antenna module 244 may be omitted or may be combined with another antenna module to process RF signals of a corresponding plurality of bands.

According to an embodiment, the third RFIC 226 and the antenna 248 may be disposed at the same substrate to form a third antenna module 246. For example, the wireless communication module 192 or the processor 120 may be disposed at a first substrate (e.g., main PCB). In this case, the third RFIC 226 is disposed in a partial area (e.g., lower surface) of the first substrate and a separate second substrate (e.g., sub PCB), and the antenna 248 is disposed in another partial area (e.g., upper surface) thereof; thus, the third antenna module 246 may be formed. By disposing the third RFIC 226 and the antenna 248 in the same substrate, a length of a transmission line therebetween can be reduced. This may reduce, for example, a loss (e.g., attenuation) of a signal of a high frequency band (e.g., about 6 GHz to about 60 GHz) to be used in 5G network communication by a transmission line. Therefore, the electronic device 101 may improve a quality or speed of communication with the second cellular network 294 (e.g., 5G network).

According to an embodiment, the antenna 248 may be formed in an antenna array including a plurality of antenna elements that may be used for beamforming. In this case, the third RFIC 226 may include a plurality of phase shifters 238 corresponding to a plurality of antenna elements, for example, as part of the third RFFE 236. Upon transmission, each of the plurality of phase shifters 238 may convert a phase of a 5G Above6 RF signal to be transmitted to the outside (e.g., a base station of a 5G network) of the electronic device 101 through a corresponding antenna element. Upon reception, each of the plurality of phase shifters 238 may convert a phase of the 5G Above6 RF signal received from the outside to the same phase or substantially the same phase through a corresponding antenna element. This enables transmission or reception through beamforming between the electronic device 101 and the outside.

The second cellular network 294 (e.g., 5G network) may operate (e.g., standalone (SA)) independently of the first cellular network 292 (e.g., legacy network) or may be operated (e.g., non-stand alone (NSA)) in connection with the first cellular network 292. For example, the 5G network may have only an access network (e.g., 5G radio access network (RAN) or a next generation (NG) RAN and have no core network (e.g., next generation core (NGC)). In this case, after accessing to the access network of the 5G network, the electronic device 101 may access to an external network (e.g., Internet) under the control of a core network (e.g., an evolved packed core (EPC)) of the legacy network. Protocol information (e.g., LTE protocol information) for communication with a legacy network or protocol information (e.g., new radio (NR) protocol information) for communication with a 5G network may be stored in the memory 130 to be accessed by other components (e.g., the processor 120, the first communication processor 212, or the second communication processor 214).

Figure 3:
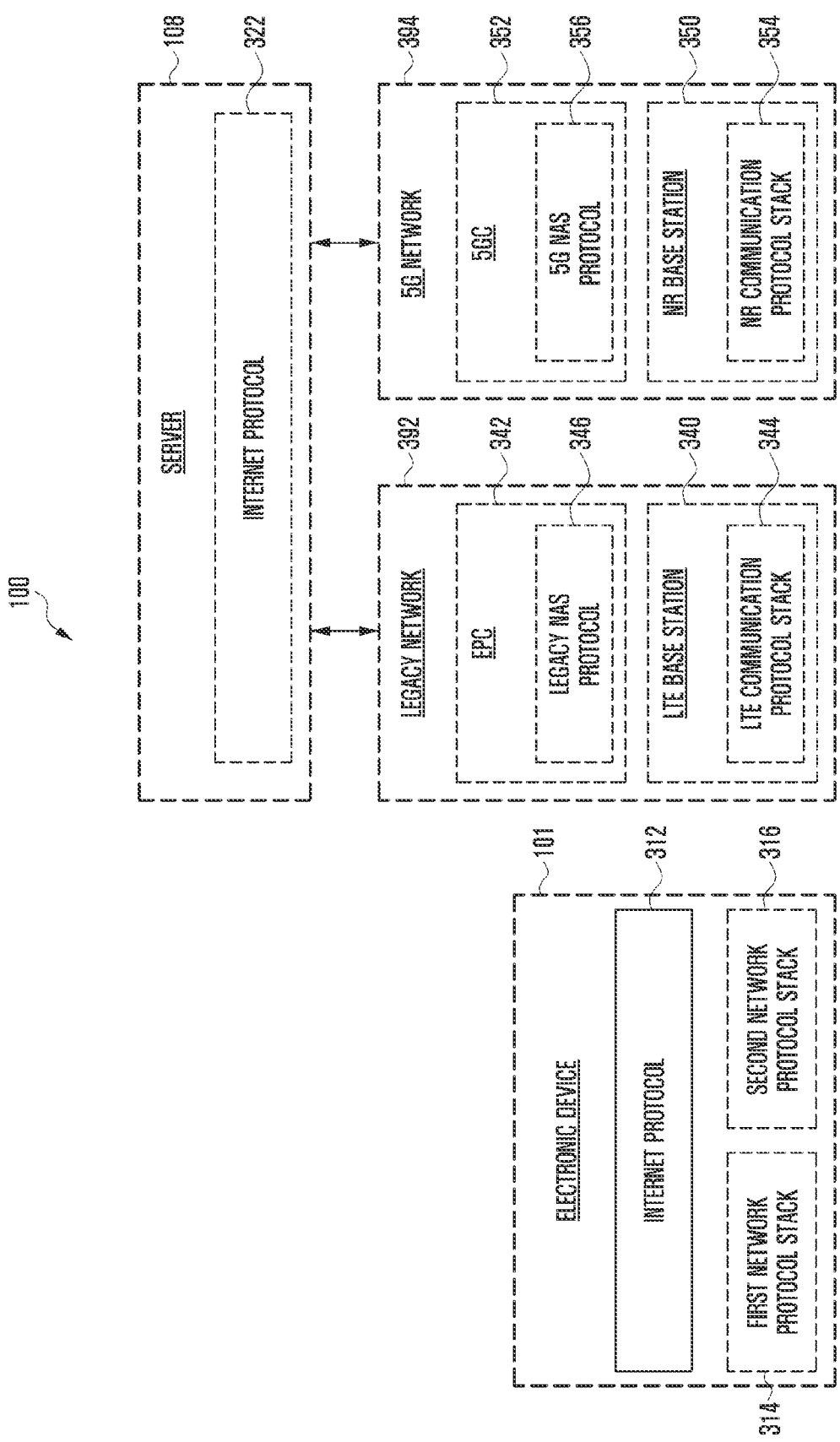
FIG. 3 is a diagram illustrating an example protocol stack structure of a network 100 of legacy communication and/or 5G communication according to various embodiments.

FIG. 3 is a block diagram illustrating an example protocol stack structure of the network 100 of legacy communication and/or 5G communication according to various embodiments.

Referring to FIG. 3, the network 100 according to an illustrated embodiment may include the electronic device 101, a legacy network 392, a 5G network 394, and the server 108.

The electronic device 101 may include an Internet protocol 312, a first communication protocol stack 314, and a second communication protocol stack 316. The electronic device 101 may communicate with the server 108 through the legacy network 392 and/or the 5G network 394.

According to an embodiment, the electronic device 101 may perform Interne communication associated with the server 108 through the Internet protocol 312 (for example, a TCP, a UDP, or an IP). The Internet protocol 312 may be executed by, for example, a main processor (for example, the main processor 121 of FIG. 1) included in the electronic device 101.

According to an embodiment, the electronic device 101 may perform wireless communication with the legacy network 392 through the first communication protocol stack 314. According to an embodiment, the electronic device 101 may perform wireless communication with the 5G network 394 through the second communication protocol stack 316. The first communication protocol stack 314 and the second communication protocol stack 316 may be executed by, for example, one or more communication processors (for example, the wireless communication module 192 of FIG. 1) included in the electronic device 101.

The server 108 may include an Internet protocol 322. The server 108 may transmit and receive data related to the Internet protocol 322 to and from the electronic device 101 through the legacy network 392 and/or the 5G network 394. According to an embodiment, the server 108 may include a cloud computing server existing outside the legacy network 392 or the 5G network 394. According to an embodiment, the server 108 may include an edge computing server (or a mobile edge computing (MEC) server) located inside at least one of the legacy network or the 5G network 394.

The legacy network 392 may include an LTE eNode B (eNB) 340 and an EPC 342. The LTE eNB 340 may include an LTE communication protocol stack 344. The EPC 342 may include a legacy NAS protocol 346. The legacy network 392 may perform LTE wireless communication with the electronic device 101 through the LTE communication protocol stack 344 and the legacy NAS protocol 346.

The 5G network 394 may include an NR gNB 350 and a 5GC 352. The NR gNB 350 may include an NR communication protocol stack 354. The 5GC 352 may include a 5G NAS protocol 356. The 5G network 394 may perform NR wireless communication with the electronic device 101 through the NR communication protocol stack 354 and the 5G NAS protocol 356.

According to an embodiment, the first communication protocol stack 314, the second communication protocol stack 316, the LTE communication protocol stack 344, and the NR communication protocol stack 354 may include a control plane protocol for transmitting and receiving a control message and a user plane protocol for transmitting and receiving user data. The control message may include a message related to at least one of, for example, security control, bearer setup, authentication, registration, or mobility management. The user data may include, for example, the remaining data except other than the control message.

According to an embodiment, the control plane protocol and the user plane protocol may include a physical (PHY) layer, a medium access control (MAC) layer, a radio link control (RLC) layer, or a packet data convergence protocol (PDCP) layer. The PHY layer may channel-code and modulate data received from, for example, a higher layer (for example, the MAC layer), transmit the data through a radio channel, demodulate and decode the data received through the radio channel, and transmit the data to the higher layer. The PHY layer included in the second communication protocol stack 316 and the NR communication protocol stack 354 may further perform an operation related to beamforming. The MAC layer may logically/physically map, for example, data to a radio channel for transmitting and receiving the data and perform a hybrid automatic repeat request (HARD) for error correction. The RLC layer may perform, for example, data concatenation, segmentation, or reassembly, and data sequence identification, reordering, or duplication detection. The PDCP layer may perform an operation related to, for example, ciphering of a control message and user data and data integrity. The second communication protocol stack 316 and the NR communication protocol stack 354 may further include a service data adaptation protocol (SDAP). The SDAP may manage allocation of radio bearers on the basis of quality of service (QoS) of user data.

According to certain embodiments, the control plane protocol may include a radio resource control (RRC) layer and a non-access stratum (NAS) layer. The RRC layer may process control, for example, data related to radio bearer setup, paging, or mobility management. The NAS may process, for example, a control message related to authentication, registration, or mobility management.

Figure 4A:
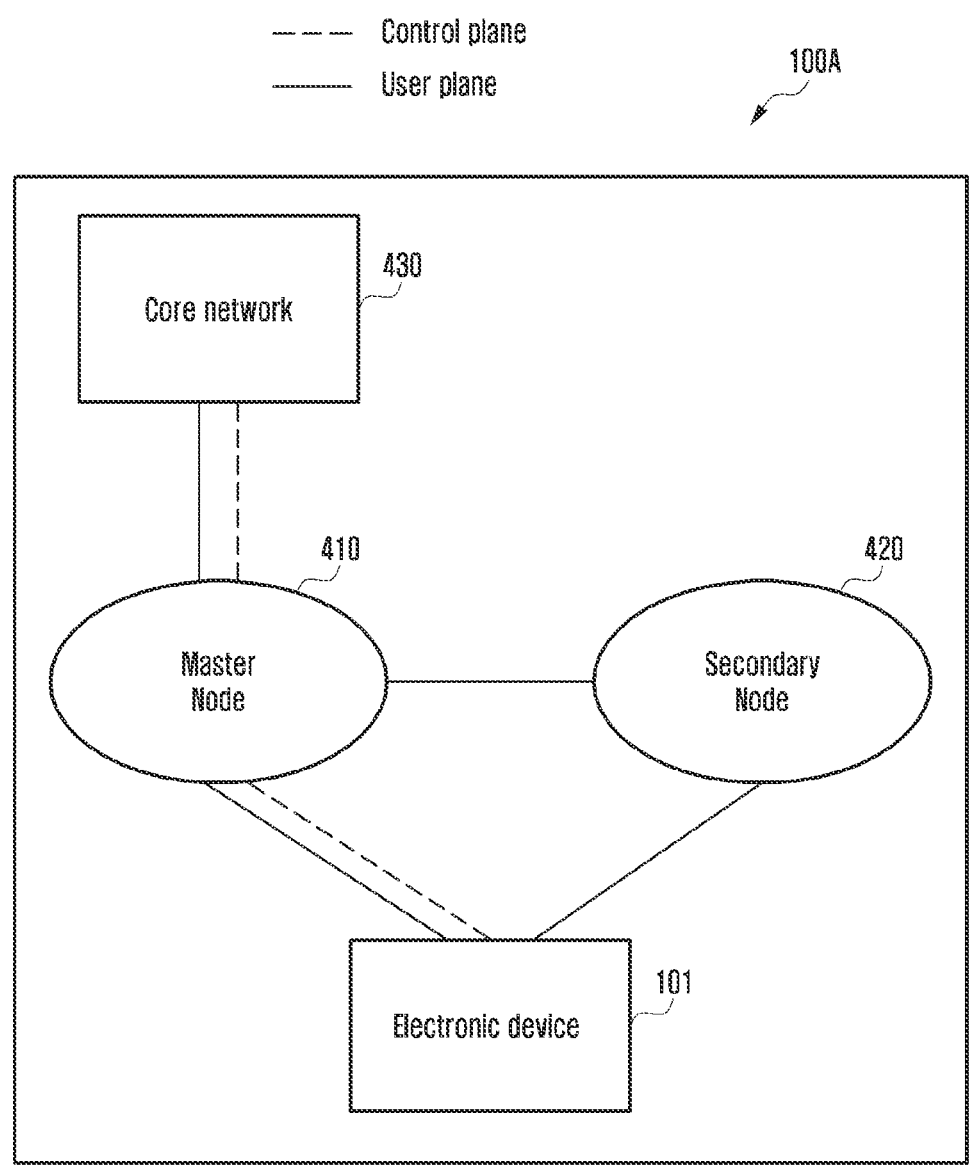
FIGS. 4A, 4B, and 4C are diagrams illustrating example wireless communication systems that provide networks of legacy communication and/or 5G communication according to various embodiments.
Figure 4B:
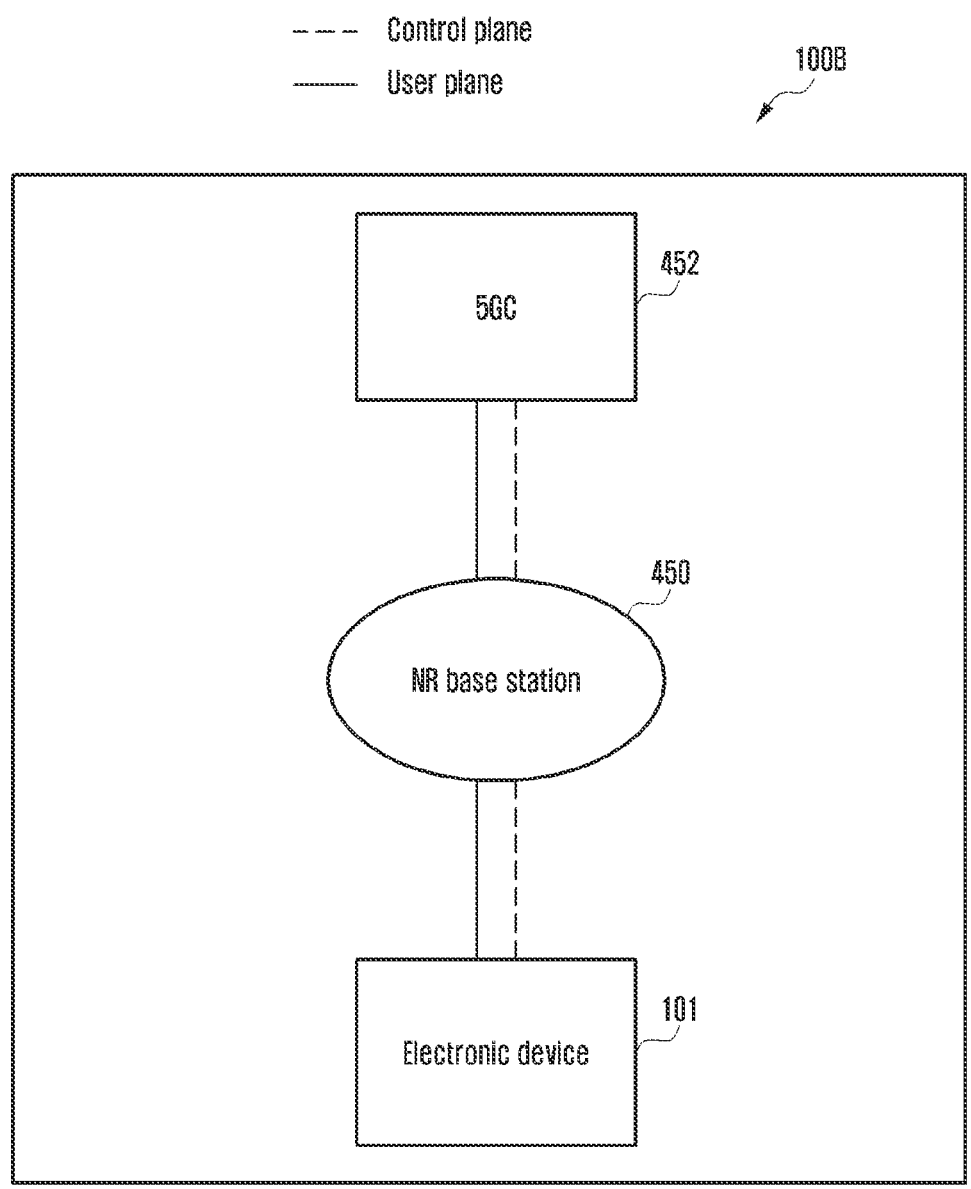
Figure 4C:
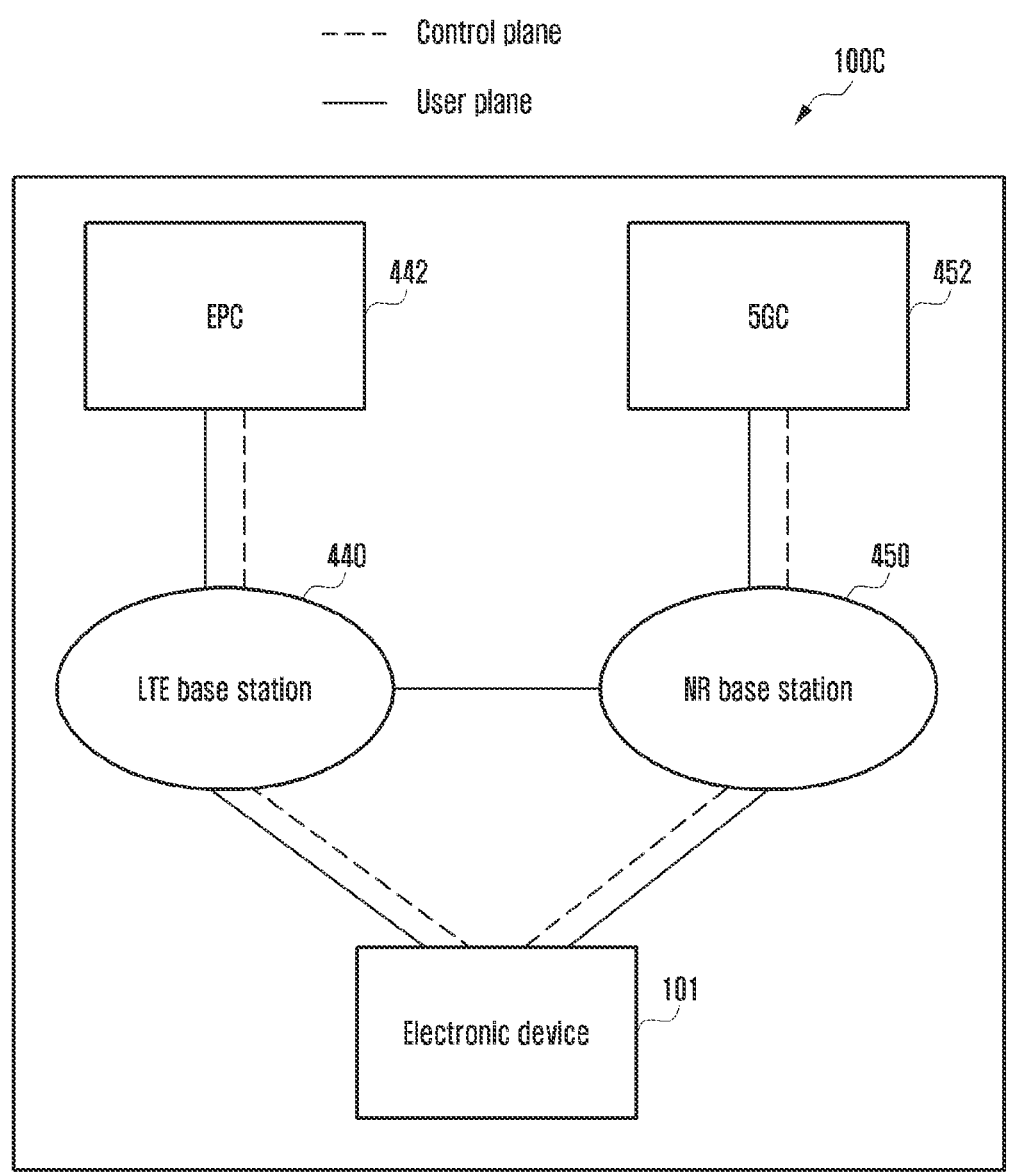

FIG. 4A is a diagram illustrating an example wireless communication system providing a network of legacy communication and/or 5G communication according to various embodiments, FIG. 4B is a diagram illustrating an example wireless communication system providing a network of legacy communication and/or 5G communication according to various embodiments, and FIG. 4C is a diagram illustrating an example wireless communication system providing a network of legacy communication and/or 5G communication according to various embodiments. Referring to FIGS. 4A, 4B and 4C, network environments 100A, 100B and 100C may include at least one of a legacy network and a 5G network. The legacy network may include, for example, a 4G or LTE eNB 450 (for example, an eNodeB (eNB)) of the 3GPP standard supporting radio access with the electronic device 101 and an evolved packet core (EPC) 451 for managing 4G communication. The 5G network may include, for example, a new radio (NR) gNB 450 (for example, a gNodeB (gNB)) supporting radio access with the electronic device 101 and a 5th generation core (5GC) 452 for managing 5G communication of the electronic device 101.

According to various embodiments, the electronic device 101 may transmit and receive a control message and user data through legacy communication and/or 5G communication. The control message may include, for example, a control message related to at least one of security control of the electronic device 101, bearer setup, authentication, registration, or mobility management. The user data may be, for example, user data other than a control message transmitted and received between the electronic device 101 and a core network 430 (for example, the EPC 442).

Referring to FIG. 4A, the electronic device 101 according to an embodiment may transmit and receive at least one of a control message or user data to and from at least some of the 5G network (for example, the NR gNB 450 and the 5GC 452) using at least some of the legacy network (for example, the LTE eNB 440 and the EPC 442).

According to various embodiments, the network environment 100A may include a network environment for providing wireless communication dual connectivity (multi-radio access technology (RAT) dual connectivity (MR-DC)) to the LTE eNB 440 and the NR gNB 450 and transmitting and receiving a control message to and from the electronic device 101 through one core network 430 of the EPC 442 or the 5GC 452.

According to various embodiments, one of the MR-DC environment, the LTE eNB 440 or the NR gNB 450 may operate as a master node (MN) 410, and the other may operate as a secondary node (SN) 420. The MN 410 may be connected to the core network 430 and transmit and receive a control message. The MN 410 and the SN 420 may be connected to each other through a network interface and transmit and receive a message related to radio resource (for example, communication channel) management.

According to various embodiments, the MN 410 may include the LTE eNB 450, the SN 420 may include the NR gNB 450, and the core network 430 may include the EPC 442. For example, a control message may be transmitted and received through the LTE eNB 440 and the EPC 442, and user data may be transmitted and received through the LTE eNB 450 and the NR gNB 450.

Referring to FIG. 4B, according to various embodiments, the 5G network may independently transmit and receive a control message and user data to and from the electronic device 101.

Referring to FIG. 4C, the legacy network and the 5G network according to various embodiments may independently provide data transmission and reception. For example, the electronic device 101 and the EPC 442 may transmit and receive a control message and user data through the LTE eNB 450. According to an embodiment, the electronic device 101 and the 5GC 452 may transmit and receive a control message and user data through the NR gNB 450.

According to various embodiments, the electronic device 101 may be registered in at least one of the EPC 442 or the 5GC 450 and transmit and receive a control message.

According to various embodiments, the EPC 442 or the 5GC 452 may interwork and manage communication of the electronic device 101. For example, movement information of the electronic device 101 may be transmitted and received through an interface between the EPC 442 and the 5GC 452.

Figure 5A:
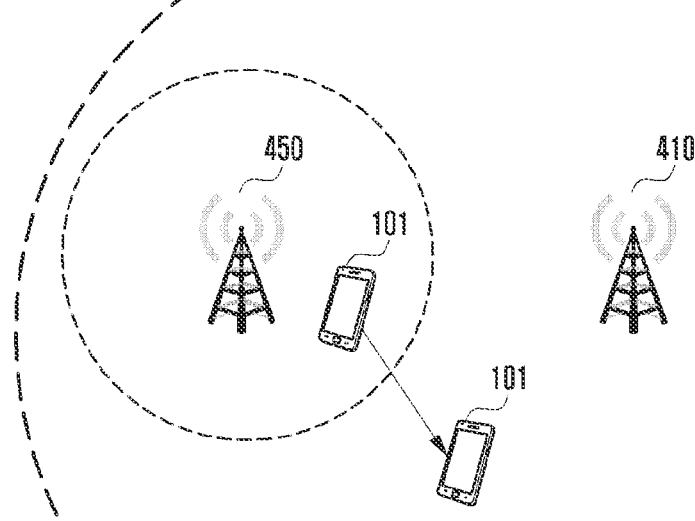
FIG. 5A is a diagram illustrating an electronic device and a cellular network according to various embodiments.

FIG. 5A is a diagram illustrating an example of an electronic device and a cellular network according to various embodiments.

According to various embodiments of the disclosure, a cellular network 500 may include a first node (e.g., NR base station 450 of FIG. 4B) and/or a second node (e.g., master node 410 of FIG. 4A).

According to various embodiments of the disclosure, the first node 450 may be a base station supporting first cellular communication. The first cellular communication, which is one of various cellular communication schemes supported by the electronic device 101, may refer to, for example, a communication scheme in a second cellular network 294 of FIG. 2. For example, the first cellular communication may be a communication scheme using a 5G mobile communication scheme (e.g., new radio). According to an embodiment, the first node 450 may be a base station supporting a standalone mode supported by the first cellular communication. The standalone mode may be a mode in which the electronic device 101 transmits or receives data using a base station supporting the first cellular communication. The electronic device 101 may be connected to the first node 450 to transmit or receive data.

According to various embodiments of the disclosure, the second node 410 may be a base station supporting the second cellular communication. The second cellular communication, which is one of various cellular communication schemes supported by the electronic device (e.g., the electronic device 101 of FIG. 1), may refer to, for example, a communication scheme in a first cellular network 292 of FIG. 2. For example, the second cellular communication may be a communication scheme using a 4G mobile communication scheme (e.g., long term evolution).

According to various embodiments of the disclosure, the first cellular communication may be cellular communication in which data communication is performed using a relatively higher frequency band compared to the second cellular communication. The frequency band of the first cellular communication may have a higher frequency band than that of the second cellular communication. The first node 450 supporting the first cellular communication may have a relatively small coverage compared to the second node 410 supporting the second cellular communication due to the high frequency band characteristics.

According to various embodiments of the disclosure, the cellular network 500 may support call connection (e.g., voice over LTE, VoLTE) using the second cellular communication due to the characteristics of the first cellular communication. The electronic device 101 may perform call connection via the second cellular communication in connection with performing call connection. In order to perform call connection in a state in which the electronic device 101 is connected to the first node 450 via the first cellular communication, the electronic device 101 may release the first cellular communication connection and may be connected to the second node 410 via the second cellular communication (e.g., evolved packet server (EPS) fallback). The electronic device 101 may receive or transmit, via the second node 410, data received via the call connection or data transmitted via the call connection.

According to various embodiments of the disclosure, the electronic device 101 may also perform call connection via short-range wireless communication (e.g., Wi-Fi) while being connected to the first node 450 via the first cellular communication. In consideration of the instability of the call connection via the short-range wireless communication, the electronic device 101 may release the first cellular communication connection and perform second cellular communication connection to wait for the transition from the call connection via the short-range wireless communication to the call connection via the second cellular communication.

According to various embodiments of the disclosure, after the call connection release, the electronic device 101 may release the second cellular communication connection and perform first cellular communication connection. The electronic device 101, when releasing the second cellular communication connection, may perform an operation (local release) of releasing the second cellular communication without exchanging a separate message with the cellular network 500. The cellular network 500, due to the failure to receive a separate message, may not confirm whether the electronic device 101 has released the second cellular communication connection, and thus the electronic device 101 may not receive data (e.g., control message, user data, and/or paging message) transmitted by the cellular network 500 via the second cellular communication. After the call connection is terminated, the electronic device 101 may scan for a node (e.g., the first node 450) supporting the first cellular communication. Under the assumption that the electronic device 101 is within the coverage of the first node 450 when performing call connection and exists outside the coverage of the first node 450 after the call connection is terminated, the electronic device 101 may fail (e.g., scan fail declared) to scan for the first node 450, or fails (e.g., NR regi fail) to register the first cellular communication via the first node 450 even if the scan for the first node 450 succeeds.

According to various embodiments of the disclosure, when the first cellular communication connection fails, the electronic device 101 may perform second cellular communication connection again and perform a tracking area update (TAU) procedure with a network supporting the second cellular communication. The TAU procedure may be a procedure that enables a network supporting the second cellular communication to track the location of the electronic device 101. The electronic device 101, which performs second cellular communication connection again, may receive data again from the network via the second cellular communication.

The electronic device 101 may be in a state in which data cannot be received and/or transmitted until the electronic device 101 attempts the first cellular communication connection after releasing (local release) the second cellular communication connection and performs second cellular communication connection again according to the failure of the first cellular communication connection. The situation described above may occur as the electronic device 101 releases the second cellular communication connection and performs connection via the first cellular communication, according to the call connection release, regardless of whether the connection via the first cellular communication is possible.

Figure 5B:
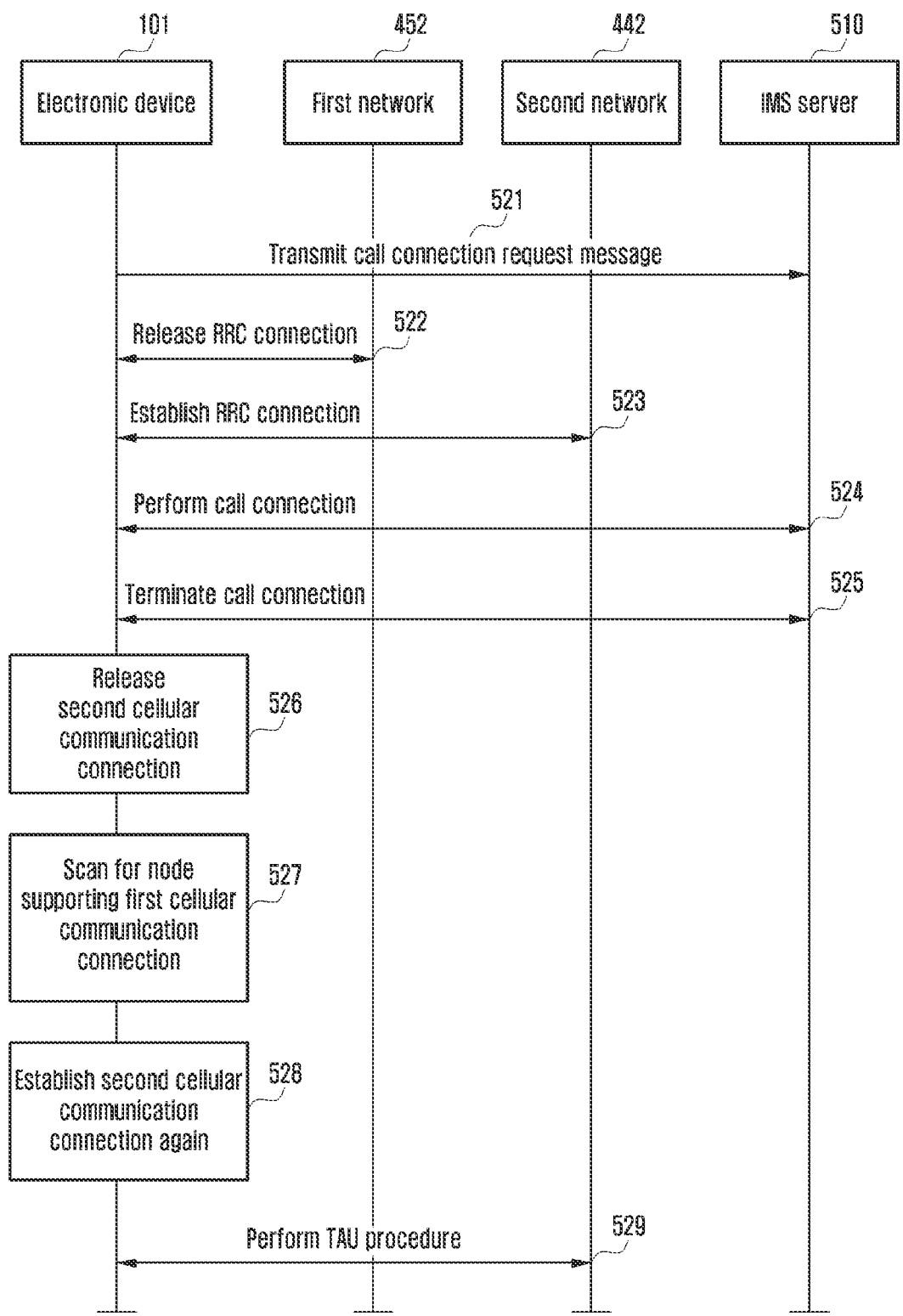
FIG. 5B is a signal flow diagram illustrating an example operation of an electronic device according to call connection and call connection release according to various embodiments.

FIG. 5B is a signal flow diagram illustrating an example operation of an electronic device according to call connection and call connection release according to various embodiments.

According to various embodiments of the disclosure, the electronic device (e.g., the electronic device 101 of FIG. 5A) transmit a call connection request message (e.g., SIP invite message defined in session initiation protocol (SIP)) to an IP multimedia subsystem (IMS) server 510 in operation 521.

The IMS server 510 may be a server that controls various functions related to a call. The IMS server 510 may transmit data exchanged in negotiation for call connection between the electronic device 101 and an external electronic device (e.g., the external electronic device 104 of FIG. 1) connected to the electronic device 101 via call connection to the electronic device 101 or the external electronic device 104.

Although the electronic device 101 is illustrated as transmitting a call connection request message to the IMS server 510, the electronic device 101 may also receive a call connection request message from the IMS server 510. The electronic device 101 may receive a call connection request message from the IMS server 510 while being connected to the first network (e.g., 5GC 452 of FIG. 4C) via the first cellular communication.

According to various embodiments of the disclosure, in operation 522, the electronic device 101 may release a radio resource control (RRC) connection (RRC release) with the first network 452 according to reception of the call connection request message.

According to various embodiments of the disclosure, the electronic device 101 may release the first cellular communication connection by releasing the RRC connection with the first network 452.

According to various embodiments of the disclosure, in operation 523, the electronic device 101 may perform RRC connection with the second network (e.g., the EPC 442 of FIG. 4C) by releasing connection with the first network 452.

According to various embodiments of the disclosure, the electronic device 101 may perform RRC connection with the second network 442 as part of an operation for the second cellular communication connection. The electronic device 101 may perform RRC connection with the second network 442 and receive an RRC reconfiguration message transmitted from the second network 442. The electronic device 101 may be connected to a node (e.g., the second node 410 of FIG. 5A) supporting the second cellular communication via the second cellular communication, based on information for the second cellular communication connection included in the RRC reconfiguration message.

According to various embodiments of the disclosure, in operation 524, the electronic device 101 may perform call connection with the IMS server 510 via the second cellular communication. The electronic device 101 may perform a video call or a voice call through a call channel with the external electronic device 104 via the second cellular communication.

According to various embodiments of the disclosure, in operation 525, the electronic device 101 may terminate the call connection with the IMS server 510 via the second cellular communication. The electronic device 101 may terminate the call connection with the IMS server 510 using call connection termination message (e.g., BYE) defined in the SIP protocol.

According to various embodiments of the disclosure, in operation 526, the electronic device 101 may release the second cellular communication connection according to the termination of the call connection.

According to various embodiments of the disclosure, after the call connection release, the electronic device 101 may release the second cellular communication connection and perform first cellular communication connection. The electronic device 101, when releasing the second cellular communication connection, may perform an operation (local release) of releasing the second cellular communication without exchanging a separate message (e.g., message for releasing the second cellular communication connection) with the second network 442. The second network 442, due to the failure to receive a separate message, may not confirm whether the electronic device 101 has released the second cellular communication connection, and thus the electronic device 101 may not receive data (e.g., control message, user data, and/or paging message) transmitted by the second network 442 via the second cellular communication.

According to various embodiments of the disclosure, in operation 527, the electronic device 101 may scan for a node supporting the first cellular communication as the second cellular communication connection is released.

After the call connection is terminated, the electronic device 101 may scan for a node supporting the first cellular communication (e.g., the first node 450 of FIG. 5A). When the electronic device 101 scans for a node supporting the first cellular communication, the electronic device 101 may scan for a node using a database (e.g., acq DB) containing the frequency band included in a message for measuring the first cellular communication, received from the second node (e.g., the second node 410 of FIG. 5A), and/or the connection history of the first cellular communication stored in the electronic device 101. The electronic device 101, when scanning for a node supporting the first cellular communication, may scan for a node supporting the first cellular communication using all the frequency bands of the first cellular communication, supported by the electronic device 101.

Under the assumption that the electronic device 101 is within the coverage of the first node 450 when performing call connection and exists outside the coverage of the first node 450 after the call connection is terminated, the electronic device 101 may fail (e.g., scan fail declared) to scan for the first node 450, or fails (e.g., NR regi fail) to register the first cellular communication via the first node 450 even if the scan for the first node 450 succeeds.

According to various embodiments of the disclosure, when the first cellular communication connection fails, the electronic device 101 may perform second cellular communication connection again in operation 528.

According to various embodiments of the disclosure, the electronic device 101 may perform a tracking area update (TAU) procedure with the second network 442 via the second cellular communication in operation 529.

The TAU procedure may be a procedure that enables a network supporting the second cellular communication to track the location of the electronic device 101. The electronic device 101, which performs second cellular communication connection again, may receive data again from the network via the second cellular communication.

The electronic device 101 may be in a state in which data cannot be received and/or transmitted until the electronic device 101 attempts the first cellular communication connection after releasing (local release) the second cellular communication connection and performs second cellular communication connection again according to the failure of the first cellular communication connection. The situation described above may occur as the electronic device 101 releases the second cellular communication connection and performs connection via the first cellular communication, according to the call connection release, regardless of whether the connection via the first cellular communication is possible.

Hereinafter, an embodiment of the electronic device 101 to minimize and/or reduce an interval in which data cannot be received or transmitted after call connection release will be described.

Figure 6:
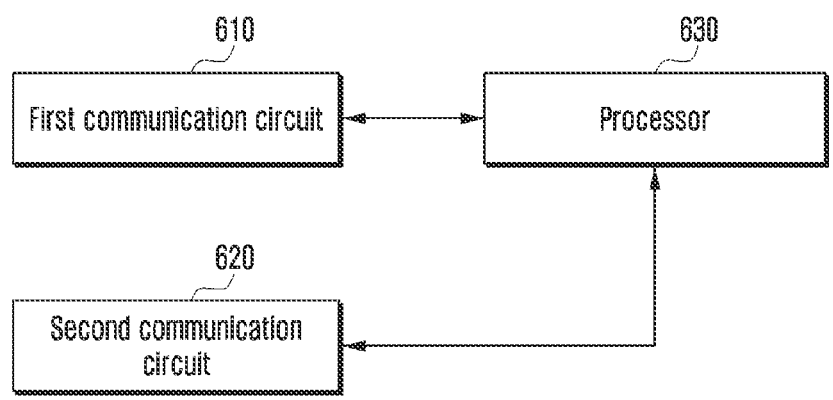
FIG. 6 is a block diagram illustrating an example configuration of an electronic device according to various embodiments.

FIG. 6 is a block diagram illustrating an example configuration of an electronic device according to various embodiments.

Referring to FIG. 6, an electronic device (e.g., the electronic device 101 of FIG. 1) according to various embodiments of the disclosure may include a first communication circuit 610 (e.g., the wireless communication module 192 of FIG. 1), a second communication circuit 620 (e.g., the wireless communication module 192 of FIG. 1), and/or a processor (e.g., including processing circuitry) 630 (e.g., the processor 120 of FIG. 1, the first communication processor 212 of FIG. 2 and/or the second communication processor 242 of FIG. 2).

According to various embodiments of the disclosure, the first communication circuit 610, may be a communication circuit configured to support the first cellular communication, may provide communication with an external electronic device (e.g., the external electronic device 104 of FIG. 1) to the electronic device 101 via the first cellular communication. The first cellular communication, which is one of various cellular communication schemes supported by the electronic device 101, may refer to, for example, a communication scheme in the second cellular network 294 of FIG. 2. For example, the first cellular communication may be a communication scheme using a 5G mobile communication scheme (e.g., new radio). According to an embodiment, the first node 450 may be a base station supporting a standalone mode supported by the first cellular communication. The standalone mode may be a mode in which the electronic device 101 transmits or receives data using a base station supporting the first cellular communication. The electronic device 101 may be connected to the first node 450 to transmit or receive data.

According to various embodiments of the disclosure, the second communication circuit 620, may be a communication circuit configured to support the second cellular communication, may provide communication with the external electronic device 104 to the electronic device 101 via the second cellular communication. The second cellular communication, which is one of various cellular communication schemes supported by the electronic device (e.g., the electronic device 101 of FIG. 1), may refer to, for example, a communication scheme in the first cellular network 292 of FIG. 2. For example, the second cellular communication may be a communication scheme using a 4G mobile communication scheme (e.g., long term evolution).

According to various embodiments of the disclosure, the processor 630 may be operatively connected to the first communication circuit 610 and/or the second communication circuit 620. The processor 630 may include various processing circuitry and control components of the electronic device 101. For example, the processor 630 may control the components of the electronic device 101 according to one or more instructions stored in a memory (e.g., the memory 130 of FIG. 1).

According to various embodiments of the disclosure, in a state in which the processor 630 is connected to a network (e.g., the first network 452 of FIG. 5B) via the first cellular communication, the processor 630 may control the first communication circuit 610 such that a call connection request message (e.g., SIP invite message defined in the session initiation protocol (SIP)) is received from an IMS server (e.g., the IMS server 510 of FIG. 5B) or a call connection request message is transmitted to the IMS server 510.

According to various embodiments of the disclosure, in a state in which the processor 630 is connected to the first cellular communication, the processor 630 may control the first communication circuit 610 such that the first cellular communication connection is released in response to transmission and/or reception of a call connection request message.

The processor 630 may control the first communication circuit 610 such that an RRC connection release message is transmitted to the first network 452 to release the first cellular communication connection.

The processor 630 may control the second communication circuit 620 such that second cellular communication connection is performed according to the release of the first cellular communication. The processor 630 may control the second communication circuit 620 such that an RRC connection request message is transmitted to the second network 442 as part of an operation of performing second cellular communication connection. The processor 630 may perform RRC connection with the second network 442 and receive an RRC reconfiguration message transmitted from the second network 442. The electronic device 101 may be connected to a node (e.g., the second node 410 of FIG. 5A) supporting the second cellular communication via the second cellular communication, based on the information for the second cellular communication connection included in the RRC reconfiguration message.

In a state in which the processor 630 connected to the network 452 via the second cellular communication, the processor 630 may control the second communication circuit 620 such that a call connection request message (e.g., SIP invite message defined in session initiation protocol (SIP)) is received from the IMS server (e.g., IMS server 510 of FIG. 5B) or a call connection request message is transmitted to the IMS server 510. When the electronic device 101 receives a call connection request message via the second cellular communication, the operation of releasing the first cellular communication may be omitted, and the connection with the network 452 via the second cellular communication may be maintained.

According to various embodiments of the disclosure, the processor 630 may exchange a message for call connection negotiation with the IMS server 510 by performing second cellular communication connection and may produce a call channel using parameters configured in the call connection negotiation. The processor 630 may control the second communication circuit 620 such that the same exchanges data with the external electronic device 104 via the produced call channel.

According to various embodiments of the disclosure, the processor 630 may receive various information via second cellular communication during or after call connection.

The processor 630 may receive a system information block via the second cellular communication. The system information block, which is information broadcasted by a node (e.g., the second node 410) supporting the second cellular communication, may include SIB 24 as defined in 3GPP TS 36.331 v15.6. The SIB 24 may include identification information of a node (e.g., the first node 450) supporting the first cellular communication, among nodes adjacent to the second node 410, a frequency band supported by the node 450 supporting the first cellular communication, and/or physical identification information of the node 450 supporting the first cellular communication.

The processor 630 may receive information (e.g., measurement configuration) related to quality measurement of the first cellular communication via the second cellular communication. The information related to quality measurement of the first cellular communication may be included in the RRC reconfiguration message. The information related to quality measurement of the first cellular communication may include a measurement object related to a node (e.g., the first node 450) supporting the first cellular communication and/or information related to a report object of a measurement result.

The measurement object, which is information required for the electronic device 101 to perform measurement, may include frequency band information (e.g., channel information) for performing node scan and quality measurement of the scanned node and/or identification information (e.g., physical cell ID) of a node that outputs a signal of a frequency band included in the frequency band information.

The report object, which is a condition for reporting the measured quality, may include identification information of an event (e.g., event B1, event B2) related to quality report, a specified threshold related to the quality of a signal transmitted by a node, and/or a time to trigger (TTT) for maintaining the satisfaction of a condition related to quality.

According to various embodiments of the disclosure, the processor 630 may confirm whether information related to quality measurement of the first cellular communication has been received after call connection is terminated, in response to the termination of the call connection. In response to reception of the information related to the quality measurement of the first cellular communication after the call connection is terminated, the processor 630 may control the first communication circuit 610 such that quality of the first cellular communication is measured based on the frequency band included in the information related to the quality measurement of the first cellular communication. The processor 630 may confirm whether the measured quality satisfies the report object and may perform first cellular communication connection when the measured quality satisfies the report object. The processor 630 may transmit the quality measurement result of the first cellular communication to the second network 442 as part of an operation of performing first cellular communication connection. The second node 410 connected to the second network 442 or the electronic device 101 may select a node to which the electronic device 101 is connected, based on the measurement result transmitted by the electronic device 101, and may transmit a message instructing connect to the selected node to the electronic device 101 via the second cellular communication. In response to reception of the message, the processor 630 may perform an operation for connection between the electronic device 101 and the node (e.g., a first node 450 supporting first cellular communication) to be connected thereto.

According to various embodiments of the disclosure, in response to failure to receive information related to the quality measurement of the first cellular communication or a failure to satisfy the report object of quality measurement result, the processor 630 may maintain the second cellular communication connection.

As part of the operation of maintaining the second cellular communication connection, the processor 630 may not perform an operation (local release) of releasing the second cellular communication without exchanging a separate message with the second network 442.

According to various embodiments of the disclosure, the processor 630 may determine while maintaining the second cellular communication connection whether to release the second cellular communication, based on whether at least one condition including a condition related to whether a system information block receivable via the second cellular communication is received is satisfied.

According to various embodiments of the disclosure, the condition related to whether the system information block receivable via the second cellular communication is received may include a condition related to whether a system information block (SIB) 24 including information of a node (e.g., the first node 450) capable of supporting the first cellular communication is received. The processor 630 may determine to release the second cellular communication when received the system information block. The processor 630 may determine to maintain the second cellular communication connection, based on a failure to receive the system information block.

According to various embodiments of the disclosure, the at least one condition may include a condition related to a size of data to be received via the second cellular communication. The condition related to the size of data to be received via the second cellular communication may include a condition in which the size of data to be received via the second cellular communication is less than or equal to a specified size (e.g., 2 Mbps). When the size of data to be received via the second cellular communication is equal to or greater than the specified size, a failure in reception of the data to be received may occur due to transition of the first cellular communication. The processor 630 may determine to release the second cellular communication when the size of data to be received via the second cellular communication is less than or equal to (or less than) the specified size. The processor 630 may determine to maintain the second cellular communication connection when the size of data to be received via the second cellular communication exceeds (or equal to or greater than) the specified size.

According to various embodiments of the disclosure, in response to termination of call connection, the processor 630 may activate a timer for processing data (or packets) to be received via the second cellular communication. The processor 630 may perform an operation of receiving data to be received via the second cellular communication while maintaining the second cellular communication connection for a specified time using the timer. The processor 630 may release the second cellular communication connection in response to expiration of the specified time.

According to various embodiments of the disclosure, the at least one condition may include a condition related to whether the second cellular communication supports a non-standalone (NSA) mode. The non-standalone mode may be a mode in which the electronic device 101 transmits or receives data using a base station supporting the first cellular communication and/or a base station supporting the second cellular communication. The processor 630 may determine to release the second cellular communication when the second cellular communication does not support the non-standalone mode. The processor 630 may determine to maintain the second cellular communication, based on confirmation that the second cellular communication connected thereto supports the non-standalone mode and that both the first cellular communication and the second cellular communication are connected thereto. According to various embodiments of the disclosure, when the at least one condition is satisfied, the processor 630 may control the first communication circuit 610 such that first cellular communication connection is performed. The processor 630 may release the second cellular communication connection before performing the first cellular communication connection.

According to various embodiments of the disclosure, as part of an operation of releasing the second cellular communication connection, the processor 630 may perform a tracking area update (TAU) procedure with a network supporting the second cellular communication. The TAU procedure may be a procedure that enables a network supporting the second cellular communication to track the location of the electronic device 101.

The processor 630 may transmit a message (e.g., tracking area request message) requesting a TAU procedure to the second network 442. The processor 630 may set an active flag among fields included in the TAU procedure request message to 0, thereby preventing and/or inhibiting the second network 442 from transmitting data to the electronic device 101 via the second cellular communication.

According to various embodiments of the disclosure, the processor 630 may perform an operation of releasing RRC connection with the second network 442 after the TAU procedure. The processor 630 may be transitioned, via the RRC connection release operation, from an active mode (or connected mode) in which data is transmittable/receivable to/from the second network 442 to an inactive mode (or idle mode) in which data is not transmittable/receivable to/from the second network 442. The processor 630 may receive an RRC connection release message from the second network 442 as part of the RRC connection release operation. The processor 630 may receive a redirection instruction from the second network 442 together with the RRC connection release message. In response to reception of the redirection instruction, the processor 630 may perform first cellular communication connection, based on information for the first cellular communication connection included in the redirection instruction. The information for the first cellular communication connection may include a frequency band of a node (e.g., the first node 450) supporting the first cellular communication. The processor 630 may scan for a node to be connected using the frequency band included in the information for the first cellular communication connection and may perform the first cellular communication connection by performing a redirection procedure for the scanned node.

According to various embodiments of the disclosure, the processor 630 may perform first cellular communication connection, based on the information for the first cellular communication connection included in the system information block, in response to a failure to receive a redirection message while receiving the RRC connection release message. The information for the first cellular communication connection may include a frequency band of a node (e.g., the first node 450) supporting the first cellular communication. The processor 630 may scan for a node to be connected using the frequency band included in the information for the first cellular communication connection and may perform the first cellular communication connection by performing a reselection procedure for the scanned node.

Through the example method described above, the electronic device 101 may not release the second cellular communication connection immediately after call connection release and may release the second cellular communication connection only when at least one condition is satisfied, thereby minimizing and/or reducing an interval in which data cannot be received or transmitted after the call connection release.

According to various embodiments of the disclosure, the processor 630 may maintain the second cellular communication connection when the at least one condition is not satisfied. The processor 630 may confirm every specified time (e.g., 5 seconds or 10 seconds) while maintaining the second cellular communication connection whether the at least one condition is satisfied. The processor 630 may release the second cellular communication connection and perform first cellular communication connection, based on confirming every specified time that the at least one condition is satisfied.

Figure 7:
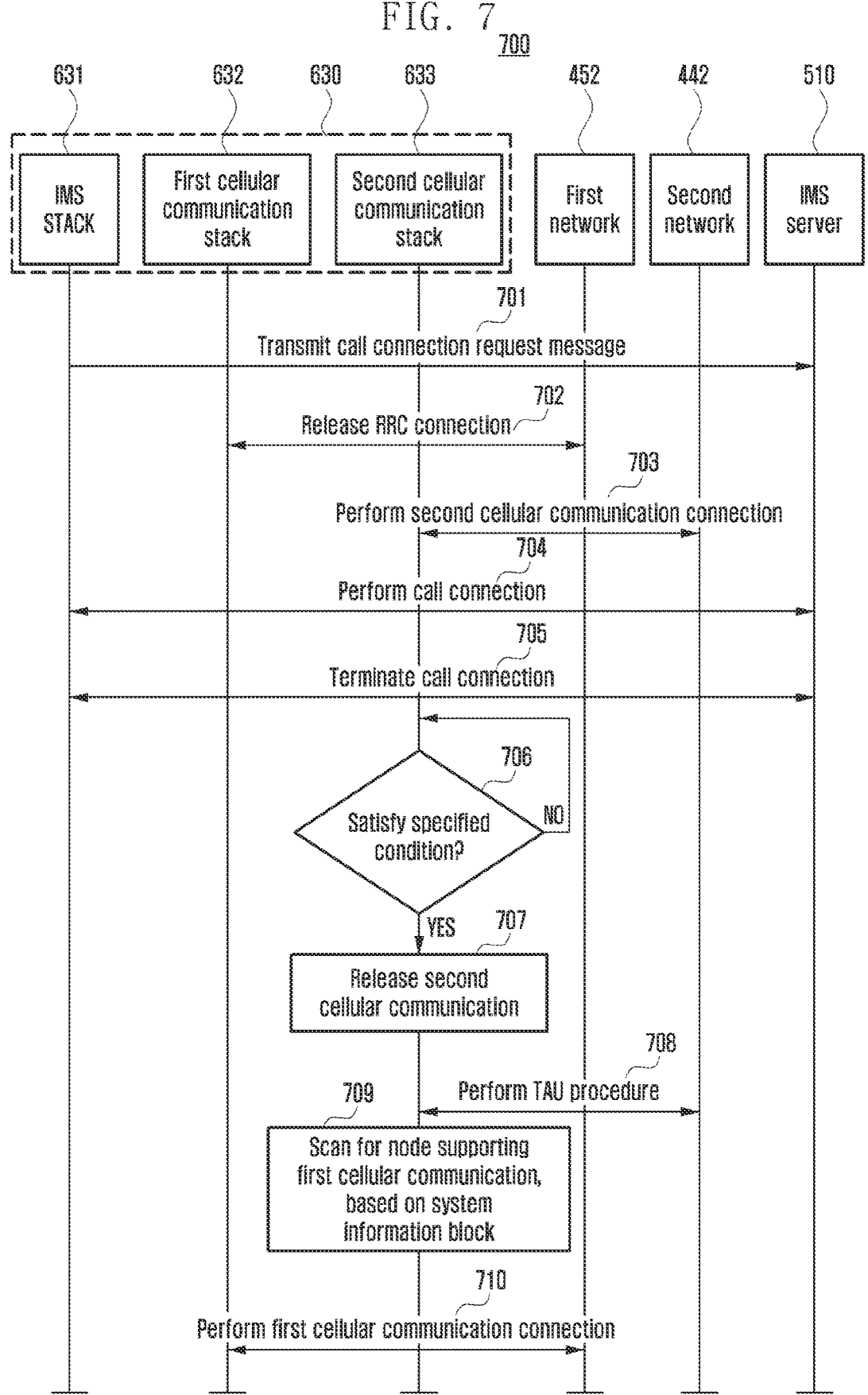
FIG. 7 is a signal flow diagram illustrating an example operation of an electronic device performing first cellular communication connection according to whether a specified condition is satisfied after call connection is terminated, according to various embodiments.

FIG. 7 is a signal flow diagram 700 illustrating an example operation of an electronic device performing first cellular communication connection according to whether a specified condition is satisfied, after call connection is terminated, according to various embodiments.

According to various embodiments of the disclosure, the processor (e.g., the processor 630 of FIG. 6) may be divided into physical and/or software components according to performable functions thereof. The processor 630 may include an IP multimedia sub-system (IMS) stack 631 that performs a function related to call connection and call connection release, a first cellular communication stack 632 that performs a function related to first cellular communication, and/or a second cellular communication stack 633 that performs a function related to the second cellular communication.

According to various embodiments of the disclosure, in operation 701, the IMS stack 631 may transmit a call connection request message (e.g., SIP invite message defined in session initiation protocol (SIP)) to the IMS server 510 (e.g., IMS server 510 of FIG. 5B).

Although the IMS stack 631 is illustrated as transmitting a call connection request message to the IMS server 510, the IMS stack 631 may also receive a call connection request message from the IMS server 510. The IMS stack 631 may receive a call connection request message from the IMS server 510 while being connected to a first network (e.g., 5GC 452 of FIG. 4C) via the first cellular communication.

According to various embodiments of the disclosure, in operation 702, the first cellular communication stack 632 and the first network (e.g., the first network 452 of FIG. 5B) may release the RRC connection.

According to various embodiments of the disclosure, the electronic device 101 may release the first cellular communication connection by releasing the RRC connection with the first network 452.

According to various embodiments of the disclosure, in operation 703, the second cellular communication stack 633 may perform second cellular communication connection with the second network (e.g., the second network 442 of FIG. 5B).

According to various embodiments of the disclosure, the second cellular communication stack 633 may perform RRC connection with the second network 442 as part of an operation for the second cellular communication connection. The second cellular communication stack 633 may perform RRC connection with the second network 442 and may receive an RRC reconfiguration message transmitted from the second network 442. The second cellular communication stack 633 may be connected to a node (e.g., the second node 410 of FIG. 5A) supporting the second cellular communication via the second cellular communication, based on the information for the second cellular communication connection included in the RRC reconfiguration message.

According to various embodiments of the disclosure, when the electronic device 101 receives and/or transmits a call connection request message while being connected via the second cellular communication, the electronic device 101 may omit an operation of releasing the first cellular communication in operations 702 or 703.

According to various embodiments of the disclosure, in operation 704, the IMS stack 631 may perform call connection with the IMS server 510 via second cellular communication.

The electronic device 101 may perform a video call or a voice call through a call channel with the external electronic device 104 via the second cellular communication.

According to various embodiments of the disclosure, in operation 705, the IMS stack 631 may perform a series of operations for terminating call connection with the IMS server 510.

The IMS stack 631 may terminate the call connection with the IMS server 510 using a call connection termination message (e.g., BYE) defined in the SIP protocol.

According to various embodiments of the disclosure, the second cellular communication stack 633 may maintain the second cellular communication connection in response to termination of the call connection. As part of the operation of maintaining the second cellular communication connection, the second cellular communication stack 633 may not perform an operation (local release) of releasing the second cellular communication without exchanging a separate message with the second network 442.

According to various embodiments of the disclosure, in operation 706, the second cellular communication stack 633 may confirm while maintaining the second cellular communication connection whether at least one condition including a condition related to whether a system information block receivable via the second cellular communication is received is satisfied.

According to various embodiments of the disclosure, the condition related to whether the system information block receivable via the second cellular communication is received may include a condition related to whether the system information block (SIB) 24 including information of a node (e.g., the first node 450) capable of supporting the first cellular communication is received. The second cellular communication stack 633 may determine to release the second cellular communication when the system information block is received. The second cellular communication stack 633 may determine to maintain the second cellular communication connection, based on a failure to receive the system information block.

According to various embodiments of the disclosure, the at least one condition may include a condition related to a size of data to be received via the second cellular communication. The condition related to the size of data to be received via the second cellular communication may include a condition in which the size of data to be received via the second cellular communication is less than or equal to a specified size (e.g., 2 Mbps). When the size of data to be received via the second cellular communication is equal to or greater than the specified size, a failure in reception of the data to be received may occur due to transition of the first cellular communication. The second cellular communication stack 633 may determine to release the second cellular communication when the size of data to be received via the second cellular communication is less than or equal to (or less than) the specified size. The second cellular communication stack 633 may determine to maintain the second cellular communication connection when the size of data to be received via the second cellular communication exceeds (or equal to or greater than) the specified size.

According to various embodiments of the disclosure, in response to termination of call connection, the electronic device 101 may activate a timer for processing data (or packets) to be received via the second cellular communication. The electronic device 101 may perform an operation of receiving data to be received via the second cellular communication while maintaining the second cellular communication connection for a specified time using the timer. The electronic device 101 may release the second cellular communication connection in response to expiration of the specified time.

According to various embodiments of the disclosure, the at least one condition may include a condition related to whether the second cellular communication supports a non-standalone (NSA) mode. The non-standalone mode may be a mode in which the electronic device 101 transmits or receives data using a base station supporting the first cellular communication and/or a base station supporting the second cellular communication. The second cellular communication stack 633 may determine to release the second cellular communication when the second cellular communication does not support the non-standalone mode. The second cellular communication stack 633 may determine to maintain the second cellular communication, based on confirmation that the second cellular communication connected thereto supports the non-standalone mode and that both the first cellular communication and the second cellular communication are connected thereto.

According to various embodiments of the disclosure, when the at least one condition is satisfied, the second cellular communication stack 633 may control the first communication circuit 610 such that first cellular communication connection is performed.

According to various embodiments of the disclosure, the second cellular communication stack 633 may maintain the second cellular communication connection when the at least one condition is not satisfied (operation 706-N). The second cellular communication stack 633 may reconfirm every specified time (e.g., 5 seconds or 10 seconds) while maintaining the second cellular communication connection whether the at least one condition is satisfied. The second cellular communication stack 633 may release the second cellular communication connection and perform first cellular communication connection, based on confirming every specified time that the at least one condition is satisfied. According to various embodiments of the disclosure, in operation 707, the second cellular communication stack 633 may release the second cellular communication connection when the at least one condition is satisfied (operation 706-Y). The second cellular communication stack 633 may release the second cellular communication connection before performing the first cellular communication connection.

According to various embodiments of the disclosure, in operation 708, the second cellular communication stack 633 may perform a tracking area update (TAU) operation with the second network 442.

According to various embodiments of the disclosure, the second cellular communication stack 633 may perform a tracking area update (TAU) procedure with a network supporting the second cellular communication as part of an operation of releasing the second cellular communication connection. The TAU procedure may be a procedure that enables a network supporting the second cellular communication to track the location of the electronic device 101.

The second cellular communication stack 633 may transmit a message (e.g., tracking area request message) requesting a TAU procedure to the second network 442. The second cellular communication stack 633 may set an active flag among fields included in the TAU procedure request message to 0, thereby preventing and/or inhibiting the second network 442 from transmitting data to the electronic device 101 via the second cellular communication.

According to various embodiments of the disclosure, in operation 709, the second cellular communication stack 633 may scan for a node supporting the first cellular communication, based on a system information block received during or after call connection.

According to various embodiments of the disclosure, the second cellular communication stack 633 may perform first cellular communication connection, based on the information for the first cellular communication connection included in the system information block. The information for the first cellular communication connection may include a frequency band of a node (e.g., the first node 450) supporting the first cellular communication. The second cellular communication stack 633 may scan for a node to be connected using the frequency band included in the information for the first cellular communication connection and may perform the first cellular communication connection by performing a reselection procedure for the scanned node.

According to various embodiments of the disclosure, in operation 710, the first cellular communication stack 632 may perform first cellular communication connection via the scanned node.

Figure 8:
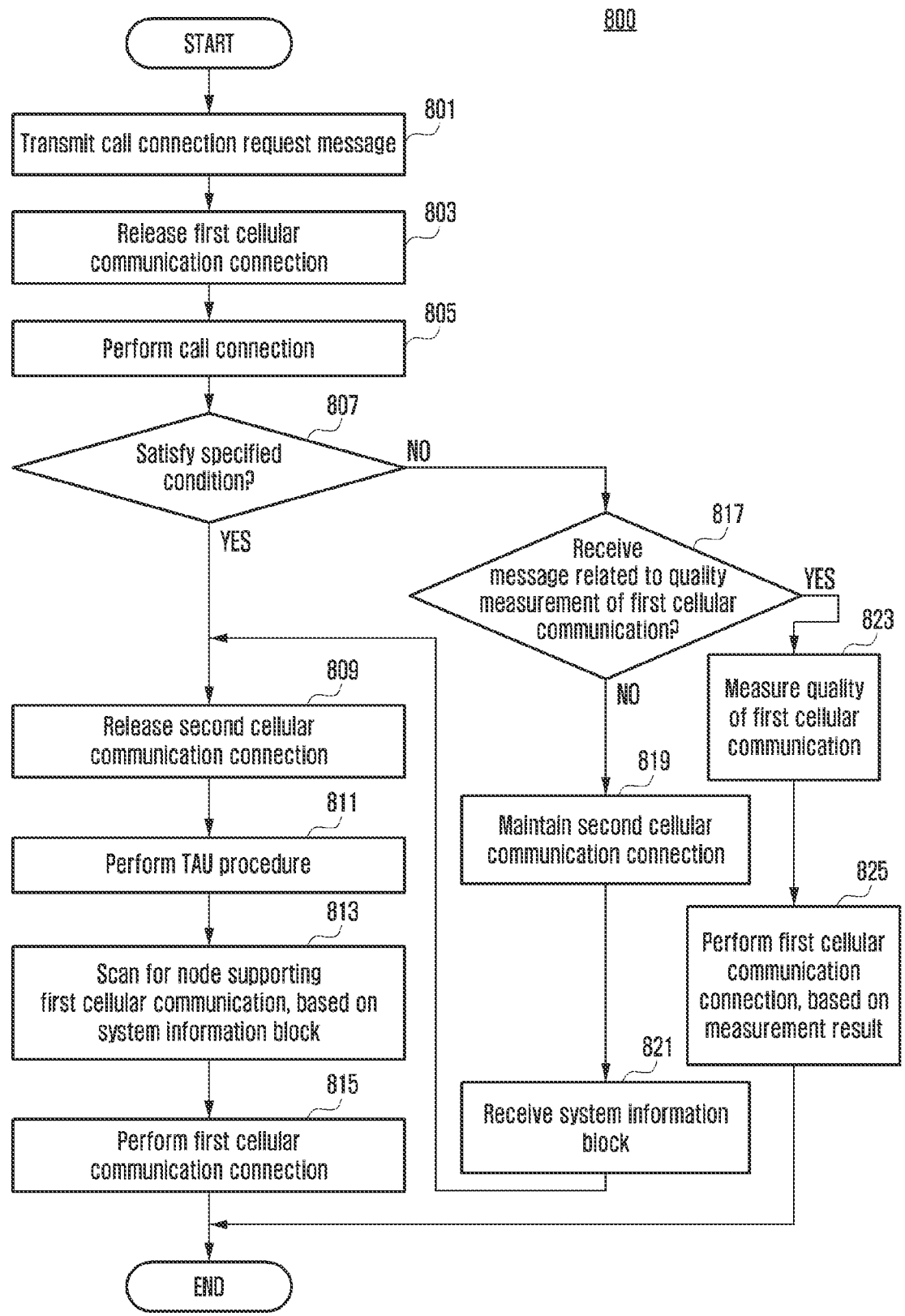
FIG. 8 is a flowchart illustrating an example operation of an electronic device performing first cellular communication connection or maintaining second cellular communication connection according to whether a specified condition is satisfied after call connection is terminated, according to various embodiments.

FIG. 8 is embodiment flowchart 800 illustrating an example operation of an electronic device performing first cellular communication connection or maintaining second cellular communication connection according to whether a specified condition is satisfied after call connection is terminated, according to various embodiments of the disclosure.

According to various embodiments of the disclosure, the electronic device (e.g., the electronic device 101 of FIG. 6) may transmit a call connection request message (e.g., SIP invite message defined in a session initiation protocol (SIP)) to an IMS server (e.g., the IMS server 510 of FIG. 5B) in operation 801.

According to various embodiments of the disclosure, the electronic device 101 may release the first cellular communication connection in operation 803.

According to various embodiments of the disclosure, the electronic device 101 may release the first cellular communication connection and perform second cellular communication connection in response to transmission and/or reception of a call connection request message while being connected to a network (e.g., 5GC 452 of FIG. 4C) via the first cellular communication.

According to various embodiments of the disclosure, the electronic device 101 may release the first cellular communication connection by releasing the RRC connection with the first network 452.

According to various embodiments of the disclosure, the electronic device 101 may perform second cellular communication connection with a second network (e.g., the second network 442 of FIG. 5B). The electronic device 101 may perform RRC connection with the second network 442 as part of an operation for the second cellular communication connection. The electronic device 101 may perform RRC connection with the second network 442 and receive an RRC reconfiguration message transmitted from the second network 442. The electronic device 101 may be connected to a node (e.g., the second node 410 of FIG. 5A) supporting second cellular communication via the second cellular communication, based on the information for the second cellular communication connection included in the RRC reconfiguration message.

According to various embodiments of the disclosure, the electronic device 101 may also maintain the second cellular communication connection in response to transmission and/or reception of a call connection request message while being connected to a network (e.g., the EPC 442 of FIG. 4C) via the second cellular communication.

According to various embodiments of the disclosure, in operation 805, the electronic device 101 may perform call connection with the IMS server 510 via the second cellular communication.

The electronic device 101 may perform a video call or a voice call through a call channel with the external electronic device 104 via the second cellular communication. The electronic device 101 may terminate the call connection with the IMS server 510 using a call connection termination message (e.g., BYE) defined in the SIP protocol.

According to various embodiments of the disclosure, in operation 807, the electronic device 101 may confirm while maintaining the second cellular communication connection whether at least one condition including a condition related to whether the system information block receivable via the second cellular communication is received is satisfied.

According to various embodiments of the disclosure, the condition related to whether the system information block receivable via the second cellular communication is received may include a condition related to whether a system information block (SIB) 24 including information of a node (e.g., the first node 450) capable of supporting the first cellular communication. The electronic device 101 may determine to release the second cellular communication, based on reception of the system information block. The second cellular communication stack 633 may determine to maintain the second cellular communication connection, based on a failure to receive the system information block.

According to various embodiments of the disclosure, the at least one condition may include a condition related to a size of data to be received via the second cellular communication. The condition related to the size of data to be received via the second cellular communication may include a condition in which the size of data to be received via the second cellular communication is less than or equal to a specified size (e.g., 2 Mbps). When the size of data to be received via the second cellular communication is equal to or greater than the specified size, a failure in reception of the data to be received may occur due to transition of the first cellular communication. The electronic device 101 may determine to release the second cellular communication when the size of data to be received via the second cellular communication is less than or equal to (or less than) the specified size. The electronic device 101 may determine to maintain the second cellular communication connection when the size of data to be received via the second cellular communication exceeds (or equal to or greater than) the specified size.

According to various embodiments of the disclosure, in response to termination of call connection, the electronic device 101 may activate a timer for processing data (or packets) to be received via the second cellular communication. The electronic device 101 may perform an operation of receiving data to be received via the second cellular communication while maintaining the second cellular communication connection for a specified time using the timer. The electronic device 101 may release the second cellular communication connection in response to expiration of the specified time.

According to various embodiments of the disclosure, the at least one condition may include a condition related to whether the second cellular communication supports a non-standalone (NSA) mode. The non-standalone mode may be a mode in which the electronic device 101 transmits or receives data using a base station supporting the first cellular communication and/or a base station supporting the second cellular communication. The electronic device 101 may determine to release the second cellular communication when the second cellular communication does not support the non-standalone mode. The electronic device 101 may determine to maintain the second cellular communication, based on confirmation that the second cellular communication connected thereto supports the non-standalone mode and that both the first cellular communication and the second cellular communication are connected thereto.

According to various embodiments of the disclosure, in operation 809, the electronic device 101 may release the second cellular communication connection when a specified condition is satisfied (operation 807-Y).

According to various embodiments of the disclosure, in operation 811, the electronic device 101 may perform a tracking area update (TAU) operation with the second network 442.

According to various embodiments of the disclosure, as part of an operation of releasing the second cellular communication connection, the electronic device 101 may perform a tracking area update (TAU) procedure with a network supporting the second cellular communication. The TAU procedure may be a procedure that enables a network supporting the second cellular communication to track the location of the electronic device 101.

The electronic device 101 may transmit a message (e.g., tracking area request message) requesting a TAU procedure to the second network 442. The electronic device 101 may set an active flag among fields included in the TAU procedure request message to 0, thereby preventing and/or inhibiting the second network 442 from transmitting data to the electronic device 101 via the second cellular communication.

According to various embodiments of the disclosure, in operation 813, the electronic device 101 may scan for a node supporting the first cellular communication, based on information for the first cellular communication connection included in the system information block.

The information for the first cellular communication connection may include a frequency band of a node (e.g., the first node 450) supporting the first cellular communication. The electronic device 101 may scan for a node to be connected using the frequency band included in the information for the first cellular communication connection and may perform the first cellular communication connection by performing a reselection procedure for the scanned node.

According to various embodiments of the disclosure, in operation 815, the electronic device 101 may perform first cellular communication connection via the scanned node.

According to various embodiments of the disclosure, in operation 817, when the specified condition is not satisfied (operation 807-N), the electronic device 101 may confirm whether a message related to quality measurement of the first cellular communication has been received after call connection is terminated.

The electronic device 101 may receive information (e.g., measurement configuration) related to quality measurement of the first cellular communication via the second cellular communication. The information related to quality measurement of the first cellular communication may be included in the RRC reconfiguration message. The information related to quality measurement of the first cellular communication may include a measurement object related to a node (e.g., the first node 450) supporting the first cellular communication and/or information related to a report object of a measurement result.

The measurement object, which is information required for the electronic device 101 to perform measurement, may include frequency band information (e.g., channel information) for performing node scan and quality measurement of the scanned node and/or identification information (e.g., physical cell ID) of a node that outputs a signal of a frequency band included in the frequency band information. The report object, which is a condition for reporting the measured quality, may include identification information of an event (e.g., event B1, event B2) related to quality report, a specified threshold related to the quality of a signal transmitted by a node, and/or a time to trigger (TTT) for maintaining the satisfaction of a condition related to quality.

According to various embodiments of the disclosure, in operation 819, the electronic device 101 may maintain the second cellular communication connection, based on a failure to receive the message related to the quality measurement of the first cellular communication (operation 817-N).

According to various embodiments of the disclosure, in operation 821, the electronic device 101 may perform operations 809, 811, 813, and 815 in response to reception of a message related to a system information block and/or quality measurement of the first cellular communication while maintaining the second cellular communication connection.

According to various embodiments of the disclosure, in operation 823, the electronic device 101 may measure the quality of the first cellular communication, based on reception of a message related to quality measurement of the first cellular communication (operation 817-Y).

In response to reception of the information related to the quality measurement of the first cellular communication after the call connection is terminated, the electronic device 101 may control the first communication circuit 610 such that quality of the first cellular communication is measured based on the frequency band included in the information related to the quality measurement of the first cellular communication.

According to various embodiments of the disclosure, in operation 825, the electronic device 101 may perform first cellular communication connection, based on the quality measurement result of the first cellular communication.

The electronic device 101 may confirm whether the measured quality satisfies the report object and may perform first cellular communication connection when the measured quality satisfies the report object. The electronic device 101 may transmit the quality measurement result of the first cellular communication to the second network 442 as part of an operation of performing first cellular communication connection. The second node 410 connected to the second network 442 or the electronic device 101 may select a node to which the electronic device 101 is connected, based on the measurement result transmitted by the electronic device 101, and may transmit a message instructing connect to the selected node to the electronic device 101 via the second cellular communication. In response to reception of the message, the electronic device 101 may perform an operation for connection between the electronic device 101 and the node (e.g., a first node 450 supporting first cellular communication) to be connected thereto.

Referring to the above-described embodiments, the electronic device 101 may perform different operations according to whether a system information block is received, whether information for quality measurement of the first cellular communication is received during call connection, and/or whether information for the quality measurement of the first cellular communication is received after the call connection. Table 1 described below summarizes the various examples described above.

TABLE 1

| Case | Whether a system information block is received | whether information for quality measurement of the first cellular communication is received during call connection | whether information for the quality measurement of the first cellular communication is received after the call connection | Operating method |
|---|---|---|---|---|
| 1 | O | O | O | Measuring the quality of the first cellular communication, based on the information for the quality measurement of the first cellular communication after call connection is released. If the quality measurement result does not satisfy the report object, performing operations 807 to 815. |
| 2 | O | O | X | Performing operations 807 to 815. |
| 3 | O | X | O | Measuring the quality of the first cellular communication, based on the information for the quality measurement of the first cellular communication after the call connection is released. If the quality measurement result does not satisfy the report object, performing operations 807 to 815. |
| 4 | O | X | X | Performing operations 807 to 815. |
| 5 | X | O | O | Measuring the quality of the first cellular communication, based on the information for the quality measurement of the first cellular communication after the call connection is released. If the quality measurement result does not satisfy the report object, maintaining the second cellular communication until an RRC release message is received from the second network 442. After receiving the RRC release message from the second network 442, attempting to establish first cellular communication connection, based on information for quality measurement of the first cellular communication received during or after the call connection. |

TABLE 1-continued

| Case | Whether a system information block is received | whether information for quality measurement of the first cellular communication is received during call connection | whether information for the quality measurement of the first cellular communication is received after the call connection | Operating method |
|---|---|---|---|---|
| 6 | X | O | X | Maintaining second cellular communication connection<br>When a system information block or information for quality measurement of the first cellular communication is received, attempting to establish the first cellular communication connection. |
| 7 | X | X | O | Measuring the quality of the first cellular communication, based on the information for the quality measurement of the first cellular communication after the call connection is released<br>If the quality measurement result does not satisfy the report object, maintaining the second cellular communication until the RRC release message is received from the second network 442.<br>After receiving the RRC release message from the second network 442, attempting to establish first cellular communication connection, based on the information for quality measurement of the first cellular communication received during or after the call connection. |
| 8 | X | X | X | Maintaining the second cellular communication connection<br>When a system information block or information for quality measurement of the first cellular communication is received, attempting to establish first cellular communication connection. |

An electronic device according to various example embodiments may include: a first communication circuit configured to support first cellular communication; a second communication circuit configured to support second cellular communication; and a processor, and the processor may be configured to: control the second communication circuit such that the first cellular communication connection is released and the second cellular communication connection is performed in response to reception and/or transmission of a call connection request message while being connected to a network via the first cellular communication, determine, in response to termination of the call connection, whether to release the second cellular communication based on whether at least one condition including a condition related to whether a system information block receivable via the second cellular communication is received is satisfied, and perform the first cellular communication connection, based on information for the first cellular communication connection included in the system information block.

In the electronic device according to various example embodiments, the processor may be configured to control the second communication circuit such that the second cellular communication connection is released, based on reception of the system information block.

In the electronic device according to various example embodiments, the processor may be configured to control the second communication circuit such that the second cellular communication connection is maintained based on a failure to receive the system information block.

In the electronic device according to various example embodiments, the processor may be configured to: measure quality of the first cellular communication based on reception of a message related to quality measurement of the first cellular communication after the call connection is released using a frequency band included in the message, release the second cellular communication connection and perform the first cellular communication connection based on the measured quality satisfying a specified condition included in the message.

In the electronic device according to various example embodiments, the processor may be configured to control the second communication circuit such that the second cellular communication connection is maintained based on termination of the call connection.

In the electronic device according to various example embodiments, the processor may be configured to: confirm a frequency band included in the system information block and control the first communication circuit such that a node supporting the first cellular communication is scanned using the frequency band.

In the electronic device according to various example embodiments, the processor may be configured to: receive a message related to quality measurement of the first cellular communication after the call connection is terminated, measure quality of the first cellular communication, and control the second communication circuit such that the second cellular communication connection is maintained based on the measured quality not satisfying a specified condition included in the message related to the quality measurement of the first cellular communication.

In the electronic device according to various example embodiments, the processor may be configured to: release the second cellular communication and perform the first cellular communication connection based on the measured quality satisfying the specified condition.

In the electronic device according to various example embodiments, the processor may be configured to control the second communication circuit such that the second cellular communication connection is maintained based on a failure to receive the message related to the quality measurement of the first cellular communication after the call connection is terminated.

In the electronic device according to various example embodiments, the at least one condition may include a condition related to a size of data to be received via the second cellular communication and/or a condition related to whether the second cellular communication supports non-standalone (NSA).

In the electronic device according to various example embodiments, the condition related to the size of data to be received via the second cellular communication may include a condition in which the size of data to be received via the second cellular communication is less than or equal to a specified size.

Figure 9:
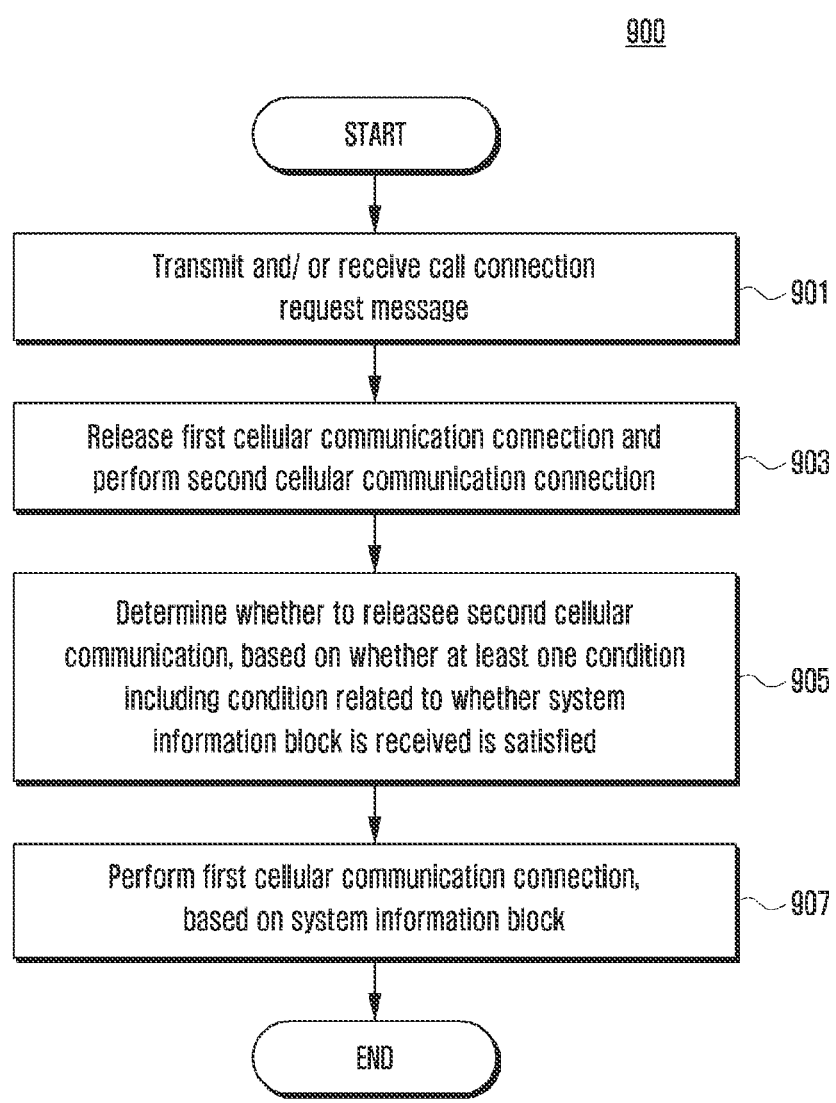
FIG. 9 is a flowchart illustrating an example method for operating an electronic device according to various embodiments.

FIG. 9 is a flowchart illustrating an example method 900 for operating an electronic device according to various embodiments.

According to various embodiments of the disclosure, in operation 901, the electronic device (e.g., the electronic device 101 of FIG. 6) may transmit and/or receive a call connection request message (e.g., SIP invite message defined in session initiation protocol (SIP)) to and/or from an IMS server (e.g., the IMS server 510 of FIG. 5B).

According to various embodiments of the disclosure, in operation 903, the electronic device 101 may release the first cellular communication connection and perform second cellular communication connection.

According to various embodiments of the disclosure, the electronic device 101 may release the first cellular communication connection and perform second cellular communication connection in response to transmission and/or reception of a call connection request message while being connected to a network (e.g., 5GC 452 of FIG. 4C) via the first cellular communication. According to various embodiments of the disclosure, the electronic device 101 may release the first cellular communication connection by releasing the RRC connection with the first network 452.

According to various embodiments of the disclosure, the electronic device 101 may perform second cellular communication connection with a second network (e.g., the second network 442 of FIG. 5B). The electronic device 101 may perform RRC connection with the second network 442 as part of an operation for the second cellular communication connection. The electronic device 101 may perform RRC connection with the second network 442 and receive an RRC reconfiguration message transmitted from the second network 442. The electronic device 101 may be connected to a node (e.g., the second node 410 of FIG. 5A) supporting second cellular communication via the second cellular communication, based on the information for the second cellular communication connection included in the RRC reconfiguration message.

According to various embodiments of the disclosure, the electronic device 101 may also maintain the second cellular communication connection in response to transmission and/or reception of a call connection request message while being connected to a network (e.g., the EPC 442 of FIG. 4C) via the second cellular communication.

According to various embodiments of the disclosure, the electronic device 101 may perform call connection with the IMS server 510 via the second cellular communication.

The electronic device 101 may perform a video call or a voice call through a call channel with the external electronic device 104 via the second cellular communication. The electronic device 101 may terminate the call connection with the IMS server 510 using a call connection termination message (e.g., BYE) defined in the SIP protocol.

According to various embodiments of the disclosure, in operation 905, the electronic device 101 may confirm while maintaining the second cellular communication connection whether at least one condition including a condition related to whether a system information block receivable via the second cellular communication is received is satisfied to determine whether to release the second cellular communication connection.

According to various embodiments of the disclosure, the condition related to whether the system information block receivable via the second cellular communication is received may include a condition related to whether a system information block (SIB) 24 including information of a node (e.g., the first node 450) capable of supporting the first cellular communication is received. The electronic device 101 may determine to release the second cellular communication, based on reception of the system information block. The second cellular communication stack 633 may determine to maintain the second cellular communication connection, based on a failure to receive the system information block.

According to various embodiments of the disclosure, the at least one condition may include a condition related to a size of data to be received via the second cellular communication. The condition related to the size of data to be received via the second cellular communication may include a condition in which the size of data to be received via the second cellular communication is less than or equal to a specified size (e.g., 2 Mbps). When the size of data to be received via the second cellular communication is equal to or greater than the specified size, a failure in reception of the data to be received may occur due to transition of the first cellular communication. The electronic device 101 may determine to release the second cellular communication, based on the size of data to be received via the second cellular communication being less than or equal to (or less than) the specified size. The electronic device 101 may determine to maintain the second cellular communication connection, based on the size of data to be received via the second cellular communication, exceeding (or equal to or greater than) the specified size.

According to various embodiments of the disclosure, in response to termination of call connection, the electronic device 101 may activate a timer for processing data (or packets) to be received via the second cellular communication. The electronic device 101 may perform an operation of receiving data to be received via the second cellular communication while maintaining the second cellular communication connection for a specified time using the timer. The electronic device 101 may release the second cellular communication connection in response to expiration of the specified time.

According to various embodiments of the disclosure, the at least one condition may include a condition related to whether the second cellular communication supports a non-standalone (NSA) mode. The non-standalone mode may be a mode in which the electronic device 101 transmits or receives data using a base station supporting the first cellular communication and/or a base station supporting the second cellular communication. The electronic device 101 may determine to release the second cellular communication when the second cellular communication does not support the non-standalone mode. The electronic device 101 may determine to maintain the second cellular communication, based on confirmation that the second cellular communication connected thereto supports the non-standalone mode and that both the first cellular communication and the second cellular communication are connected thereto.

According to various embodiments of the disclosure, in operation 907, the electronic device 101 may perform first cellular communication connection, based on information for the first cellular communication connection included in a system information block.

According to various embodiments of the disclosure, the electronic device 101 may scan for a node supporting the first cellular communication, based on the information for the first cellular communication connection included in the system information block.

The information for the first cellular communication connection may include a frequency band of a node (e.g., the first node 450) supporting the first cellular communication. The electronic device 101 may scan for a node to be connected using the frequency band included in the information for the first cellular communication connection and may perform the first cellular communication connection by performing a reselection procedure for the scanned node.

According to various embodiments of the disclosure, the electronic device 101 may perform the first cellular communication connection via the scanned node.

A method for operating an electronic device according to various example embodiments of the disclosure may include: releasing first cellular communication connection and performing second cellular communication connection in response to reception of a call connection request message in a state in which a network connection is established through the first cellular communication; determining, in response to termination of the call connection, whether to release the second cellular communication connection based on whether at least one condition including a condition related to whether a system information block received via the second cellular communication is received is satisfied; and performing the first cellular communication connection based on information for the first cellular communication connection included in the system information block.

In the method for operating an electronic device according to various example embodiments, the determining whether to release the second cellular communication may include releasing the second cellular communication connection, based on reception of the system information block.

In the method for operating an electronic device according to various example embodiments, the determining whether to release the second cellular communication may include maintaining the second cellular communication connection based on a failure to receive the system information block.

The method for operating an electronic device according to various example embodiments may further include: measuring quality of the first cellular communication based on reception of a message related to quality measurement of the first cellular communication after the call connection is released using a frequency band included in the message; and releasing the second cellular communication connection and performing the first cellular communication connection based on the measured quality satisfying a specified condition included in the message.

The method for operating an electronic device according to various example embodiments may further include maintaining the second cellular communication connection based on termination of the call connection.

The method for operating an electronic device according to various example embodiments may further include: confirming a frequency band included in information for the first cellular communication connection; and scanning for a node supporting the first cellular communication using the frequency band.

The method for operating an electronic device according to various example embodiments may further include: receiving a message related to quality measurement of the first cellular communication after the call connection is terminated; measuring quality of the first cellular communication; and maintaining the second cellular communication connection based on the measured quality not satisfying a specified condition included in the message related to the quality measurement of the first cellular communication.

The method for operating an electronic device according to various example embodiments may further include maintaining the second cellular communication connection based on a failure to receive a message related to quality measurement of the first cellular communication after the call connection is terminated.

In the method for operating an electronic device according to various example embodiments, the at least one condition may include a condition related to a size of data to be received via the second cellular communication, and/or a condition related to whether the second cellular communication supports non-standalone (NSA).

The electronic device according to various example embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
a first communication circuit configured to support first cellular communication;
a second communication circuit configured to support second cellular communication; and
a processor,
wherein the processor is configured to:
control the second communication circuit such that the second cellular communication connection is performed and/or maintained in response to reception and/or transmission of a call connection request message while being connected to a network,
determine, in response to termination of the call connection, whether to release the second cellular communication based on whether at least one condition including a condition related to whether a system information block receivable via the second cellular communication is received is satisfied, and
perform the first cellular communication connection based on information for the first cellular communication connection included in the system information block.

2. The electronic device of claim 1, wherein the processor is configured to control the second communication circuit such that the second cellular communication connection is released based on reception of the system information block.

3. The electronic device of claim 1, wherein the processor is configured to control the second communication circuit such that the second cellular communication connection is maintained based on a failure to receive the system information block.

4. The electronic device of claim 2, wherein the processor is configured to:
measure quality of the first cellular communication based on reception of a message related to quality measurement of the first cellular communication after the call connection is released using a frequency band included in the message, and
release the second cellular communication connection and perform the first cellular communication connection based on the measured quality satisfying a specified condition included in the message.

5. The electronic device of claim 1, wherein the processor is configured to control the second communication circuit such that the second cellular communication connection is maintained based on termination of the call connection.

6. The electronic device of claim 1, wherein the processor is configured to:
confirm a frequency band included in the system information block, and
control the first communication circuit such that a node supporting the first cellular communication is scanned using the frequency band.

7. The electronic device of claim 1, wherein the processor is configured to:
receive a message related to quality measurement of the first cellular communication based on the call connection being terminated,
measure quality of the first cellular communication, and
control the second communication circuit such that the second cellular communication connection is maintained based on the measured quality not satisfying a specified condition included in the message related to the quality measurement of the first cellular communication.

8. The electronic device of claim 7, wherein the processor is configured to: release the second cellular communication connection and perform the first cellular communication connection based on the measured quality satisfying the specified condition.

9. The electronic device of claim 1, wherein the processor is configured to control the second communication circuit such that the second cellular communication connection is maintained based on a failure to receive a message related to quality measurement of the first cellular communication after the call connection is terminated.

10. The electronic device of claim 1, wherein the at least one condition comprises a condition related to a size of data to be received via the second cellular communication, and/or a condition related to whether the second cellular communication supports non-standalone (NSA).

11. The electronic device of claim 10, wherein the condition related to the size of data to be received via the second cellular communication comprises a condition in which the size of data to be received via the second cellular communication is less than or equal to a specified size.

12. A method of operating an electronic device, the method comprising:
releasing first cellular communication connection and performing second cellular communication connection or maintaining the second cellular communication connection in response to reception of a call connection request message in a network-connected state;
determining, in response to termination of the call connection, whether to release the second cellular communication based on whether at least one condition including a condition related to whether a system information block received via the second cellular communication is received is satisfied; and
performing the first cellular communication connection, based on information for the first cellular communication connection included in the system information block.

13. The method of claim 12, wherein the determining whether to release the second cellular communication comprises releasing the second cellular communication connection based on reception of the system information block.

14. The method of claim 12, wherein the determining whether to release the second cellular communication comprises maintaining the second cellular communication connection based on a failure to receive the system information block.

15. The method of claim 13, further comprising:
measuring quality of the first cellular communication based on reception of a message related to quality measurement of the first cellular communication after the call connection is released using a frequency band included in the message; and
releasing the second cellular communication connection and performing the first cellular communication connection based on the measured quality satisfying a specified condition included in the message.

16. The method of claim 13, further comprising maintaining the second cellular communication connection based on termination of the call connection.

17. The method of claim 12, further comprising:
confirming a frequency band included in information for the first cellular communication connection; and
scanning for a node supporting the first cellular communication using the frequency band.

18. The method of claim 12, further comprising:
receiving a message related to quality measurement of the first cellular communication based on the call connection being terminated;
measuring quality of the first cellular communication; and
maintaining the second cellular communication connection based on the measured quality not satisfying a specified condition included in the message related to the quality measurement of the first cellular communication.

19. The method of claim 12, further comprising maintaining the second cellular communication connection based on a failure to receive a message related to quality measurement of the first cellular communication after the call connection is terminated.

20. The method of claim 12, wherein the at least one condition comprises a condition related to a size of data to be received via the second cellular communication, and/or a condition related to whether the second cellular communication supports non-standalone (NSA).

* * * * *